US012784038B2

(12) United States Patent
Singh

(10) Patent No.: US 12,784,038 B2
(45) Date of Patent: Nov. 3, 2026

(54) SYSTEMS AND METHODS FOR BLOCKCHAIN-BASED TRANSACTION BREAK PREVENTION

(71) Applicant: CITIBANK, N.A., New York, NY (US)

(72) Inventor: Shishir Singh, New York, NY (US)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 19/300,347

(22) Filed: Aug. 14, 2025

(65) Prior Publication Data

US 2025/0371530 A1 Dec. 4, 2025

Related U.S. Application Data

(63) Continuation of application No. 18/670,286, filed on May 21, 2024, now Pat. No. 12,417,450, which is a
(Continued)

(51) Int. Cl.
*G06Q 20/38* (2012.01)
*G06Q 20/36* (2012.01)
(Continued)

(52) U.S. Cl.
CPC ..... *G06Q 20/3827* (2013.01); *G06Q 20/3674* (2013.01); *H04L 9/0637* (2013.01);
(Continued)

(58) Field of Classification Search
CPC ........... G06Q 20/3827; G06Q 20/3674; G06Q 20/4016; G06Q 20/401; H04L 9/0637;
(Continued)

(56) References Cited

U.S. PATENT DOCUMENTS 11,049,128 B1 6/2021 Olson
11,310,060 B1 4/2022 Poelstra et al.
(Continued)

FOREIGN PATENT DOCUMENTS

CN 101833732 A * 9/2010
CN 105631028 A 6/2016
(Continued)

OTHER PUBLICATIONS

Andreas Antonopoulos, Mastering Bitcoin, Jun. 2017, O'Reilly Media, Inc. (Year: 2017).*
(Continued)

*Primary Examiner* — Chunling Ding
(74) *Attorney, Agent, or Firm* — Foley & Lardner LLP

(57) ABSTRACT

A computer-implemented method comprising receiving a transaction request from a first computing device, the transaction request corresponding to a pending transaction between the first computing device and a second computing device and comprising a first set of transaction attributes; appending block instances to blockchains of the first and second computing devices, retrieving or receiving, from the second computing device, a second set of transaction attributes; when the first set of transaction attributes match, identifying a second blockchain associated with the pending transaction; automatically executing a protocol to compare the first set of transaction attributes with data stored onto a ledger of the identified second blockchain; and, in response to determining that the first set of transaction attributes complies with data of the ledger of the identified second blockchain, appending block instance to the blockchain comprising data corresponding to the transaction request to blockchains of the first and second computing devices.

20 Claims, 8 Drawing Sheets

Related U.S. Application Data continuation of application No. 18/121,981, filed on Mar. 15, 2023, now Pat. No. 12,051,063, which is a continuation of application No. 16/986,699, filed on Aug. 6, 2020, now Pat. No. 11,645,650.

(51) Int. Cl.
*H04L 9/06* (2006.01)
*H04L 9/00* (2022.01)

(52) U.S. Cl.
CPC .............. *H04L 9/0643* (2013.01); *H04L 9/50* (2022.05); *H04L 2209/56* (2013.01)

(58) Field of Classification Search
CPC ..... H04L 9/0643; H04L 9/50; H04L 2209/56; H04L 63/123
See application file for complete search history.

(56) References Cited

U.S. PATENT DOCUMENTS

| | | | | |
|---|---|---|---|---|
| 2018/0130034 | A1 | 5/2018 | Taylor et al. | |
| 2018/0315051 | A1 | 11/2018 | Hurley et al. | |
| 2019/0018887 | A1 | 1/2019 | Madisetti et al. | |
| 2019/0156416 | A1 | 5/2019 | Jayaram et al. | |
| 2019/0305950 | A1* | 10/2019 | Treat | H04L 9/3239 |
| 2019/0311357 | A1 | 10/2019 | Madisetti et al. | |
| 2019/0340267 | A1 | 11/2019 | Vo et al. | |
| 2019/0347657 | A1* | 11/2019 | Guo | G06Q 20/10 |
| 2020/0042635 | A1 | 2/2020 | Douglass et al. | |
| 2020/0051129 | A1* | 2/2020 | Harris | G06Q 30/0283 |
| 2020/0074458 | A1 | 3/2020 | Govindarajan et al. | |
| 2020/0098042 | A1 | 3/2020 | Hoshizuki | |
| 2020/0202396 | A1 | 6/2020 | Feng et al. | |
| 2020/0213090 | A1 | 7/2020 | Gupta | |
| 2020/0252202 | A1* | 8/2020 | Madl | H04L 63/12 |
| 2020/0278958 | A1 | 9/2020 | Zhang et al. | |
| 2020/0349564 | A1 | 11/2020 | Padmanabhan et al. | |
| 2021/0119807 | A1* | 4/2021 | Chen | H04L 9/3242 |
| 2021/0120083 | A1 | 4/2021 | Kwun et al. | |
| 2021/0150515 | A1* | 5/2021 | Lu | G06Q 20/389 |
| 2021/0160252 | A1* | 5/2021 | Qiu | H04L 67/565 |
| 2021/0174343 | A1* | 6/2021 | Aggarwal | G06Q 20/389 |
| 2021/0279761 | A1 | 9/2021 | Olson | |
| 2021/0357369 | A1* | 11/2021 | Kwon | G06F 16/1837 |
| 2021/0369014 | A1 | 12/2021 | Vukich et al. | |
| 2021/0398116 | A1 | 12/2021 | Fang et al. | |
| 2022/0231869 | A1 | 7/2022 | Liu | |
| 2023/0035321 | A1 | 2/2023 | Vijayaraghavan | |
| 2023/0185942 | A1 | 6/2023 | Hanebeck | |
| 2023/0252457 | A1 | 8/2023 | Yamaoka et al. | |
| 2025/0209448 | A1 | 6/2025 | Huang et al. | |

FOREIGN PATENT DOCUMENTS

| | | | | |
|---|---|---|---|---|
| CN | 109523380 A | | 3/2019 | |
| CN | 110766408 A | | 2/2020 | |
| CN | 110866750 A | | 3/2020 | |
| CN | 111080449 A | | 4/2020 | |
| CN | 111105222 A | | 5/2020 | |
| CN | 111127011 A | | 5/2020 | |
| CN | 112714158 A | | 4/2021 | |
| CN | 111181968 B | | 9/2021 | |
| CN | 114493879 A | * | 5/2022 | G06Q 40/04 |
| EP | 3 726 774 A1 | | 10/2020 | |
| WO | WO-2018232494 A1 | * | 12/2018 | H04L 9/50 |
| WO | WO-2019/001141 A1 | | 1/2019 | |
| WO | WO-2019/195108 A1 | | 10/2019 | |
| WO | WO-2020/036731 A1 | | 2/2020 | |
| WO | WO-2020220740 A1 | * | 11/2020 | H04L 9/0637 |
| WO | WO-2021/026174 A1 | | 2/2021 | |
| WO | WO-2021/082340 A1 | | 5/2021 | |

OTHER PUBLICATIONS

Andreas Antonopoulos, Mastering Bitcoin, Jul. 2017, O'Reilly Media, Inc., Second Edition (Year: 2017).

Andreas M. Antonopoulos, Mastering Bitcoin, Dec. 2014, O'Reilly Media, Inc (Year: 2014).

International Search Report and Written Opinion issued in International Application No. PCT/US2024/020053 dated Jul. 2, 2024 (15 Pages).

* cited by examiner

400

SYSTEMS AND METHODS FOR BLOCKCHAIN-BASED TRANSACTION BREAK PREVENTION

CROSS-REFERENCE TO RELATED APPLICATIONS

This application claims the benefit of priority as a continuation to U.S. patent application Ser. No. 18/670,286, filed May 21, 2024, which claims the benefit of priority as a continuation to U.S. patent application Ser. No. 18/121,981, filed Mar. 15, 2023, which claims the benefit of priority as a continuation to U.S. patent application Ser. No. 16/986,699, filed Aug. 6, 2020, the entirety of each of which is incorporated by reference herein.

TECHNICAL FIELD

This application relates generally to preventing breaks and maintaining the integrity of transactions across computing systems using blockchain-based technology.

BACKGROUND

As the processing power of computers allows for greater computer functionality and the Internet technology era allows for interconnectivity between computing systems, computing systems rely on highly complex computer infrastructures to facilitate transactions between different entities. It is common practice for entities under the same corporate umbrella to enter into transactions in which the parties to the transaction can loan and receive funds from each other. Such transactions can be complex and have many terms that can change over time. Methods of keeping track of these transactions include manually entering the data into a computer while the computer maintains a running count of the values of the attributes of the transactions. A problem with such manual entry is it is subject to human and/or network error. For example, two parties to a transaction may enter data of their transaction into their respective databases. The two parties may do so following their own coding and transaction booking practices into their own computer systems and databases after an initial agreement on the terms of the transaction. In some instances, there may be a miscommunication about the terms of the transaction, typographical errors from the users that input the terms to the transaction, different timing of the transaction entry due to geographical spread time zones (e.g., when an eastern entity has closed its business while a western entity has just started its business day), differences in the computing systems that the two parties use to enter the terms of the transaction, differences in the unique booking practices and transaction attributes of the two parties, etc., that causes the two parties to enter differing terms for the same transaction.

In another example, the internal calendar or clocks of the computers involved in the transaction may not be synchronized, so each computer may generate transaction data that indicates the transaction covers a different time period. The computer may not be able to distinguish which terms are accurate, and thus the computer may identify the transaction as a transaction break. The computer may not process the transaction break or may be configured to choose the terms entered by one user over the other when determining the impact of the transaction on the entities of the transaction.

With the large volume of transactions that may occur daily between entities, the computer may identify many transaction breaks every day. Each transaction break may slow down the computer's processing as it attempts to maintain counts and accurate data of the transactions that occur between entities. For each transaction break, the computer may have to determine which set of terms to process or otherwise not process the transaction break at all. Such transaction breaks may lead to erroneous results and unreliable data counters and analytics (e.g., for large financial institutions, these breaks may cause cash flow issues or unwarranted capital exposure and borrowing and lending risks that could lead to large financial losses). Existing and conventional methods have failed to provide fast, efficient, and continuous analysis of transaction data that is associated with different transactions.

SUMMARY

For the aforementioned reasons, there is a desire for a computing technology and a software solution to address the above-described challenges. There is a desire for a more efficient and accurate system and method for avoiding transaction breaks and continuously processing large transaction datasets, which would allow for an accurate analysis of transaction data than is currently possible with systems that do not implement the systems and methods described herein.

The systems and methods provided herein provide for a blockchain-based method for authenticating transactions while ensuring that only transaction blocks for transactions in which both sides have provided matching terms are generated. The system may check the terms generated by the parties to a transaction against each other and, when the terms match, the system may generate a transaction block including identical terms for the transaction.

Using the systems and methods described herein, transaction breaks can be prevented by only executing transactions in which both parties to the transaction are in agreement to the terms of the transaction, ensuring the processing of such transactions can proceed uninterrupted. The systems and methods described herein provide a method for doing so while maintaining the privacy of each computer to the transaction so other computers or nodes that maintain the blockchain may not learn the terms of the transaction. Further, the system can avoid generating and validating transaction blocks for transactions in which parties do not agree on the terms, saving valuable processing time and power.

Furthermore, the system can ensure that neither party to a transaction will have to renege on a smart contract because of terms that conflict with internal rules to the party's system. Such conflicts may cause a transaction between entities to be void and for the entities to upload new smart transaction data for the transaction until a proper transaction has been agreed upon (e.g., a transaction record that includes matching terms and that complies with the rules of each entity). The system and method provided herein ensure that the terms of the transaction do not have to be renegotiated between the parties after the transaction block instance (e.g., generated by a smart contract) has been appended to the blockchain. Instead, the system and method provides for creating regulation blocks that include sets of rules that are specific to each entity and may restrict a block instance for a transaction from being appended to the blockchain if not all of the rules are met. Consequently, nodes of the blockchain may avoid verifying and appending multiple transaction blocks to the blockchain for the same transaction, saving valuable computing resources and increasing the speed with which block instances for transactions are appended to the blockchain.

In one embodiment, a system comprises a plurality of nodes each corresponding to a computing device having a processor and memory to store data, wherein a consensus of the plurality of nodes is configured to: receive a first transaction request from a first computing device, the transaction request corresponding to a pending transaction between the first computing device and a second computing device and comprising a first set of transaction attributes; append a first block instance comprising the first set of transaction attributes to a blockchain of the first computing device; identify a blockchain of the second computing device based on a transaction attribute of the first set of transaction attributes; append a second block instance comprising the first set of transaction attributes to a blockchain of the second computing device; retrieve or receive, from the second computing device, a second transaction request, the second transaction request corresponding to the pending transaction between the first computing device and the second computing device and comprising a second set of transaction attributes corresponding to the pending transaction; when the first set of transaction attributes matches the second set of transaction attributes: identify, using at least one transaction attribute, a second blockchain of the second computing device; automatically execute a protocol to compare the second set of transaction attributes with data stored onto a ledger of the identified second blockchain; and, in response to determining that the second set of transaction attributes complies with data of the ledger of the identified second blockchain, append a third block instance to the blockchain of the first computing device and a fourth block instance to the blockchain of the second computing device, the third block instance and the fourth block instance comprising data corresponding to the second transaction request.

In another embodiment, a method comprises: receiving, by a consensus of a plurality of nodes, a transaction request from a first computing device, the transaction request corresponding to a pending transaction between the first computing device and a second computing device, the transaction request comprising a first set of transaction attributes; appending, by the consensus of the plurality of nodes, a first block instance indicating the pending transaction to the blockchain of the first computing device; identifying, by the consensus of the plurality of nodes, a blockchain of the second computing device based on a transaction attribute of the first set of transaction attributes; appending, by the consensus of the plurality of nodes, a second block instance indicating the pending transaction to a blockchain of the second computing device; retrieving or receiving, by the consensus of the plurality of nodes, from the second computing device, a second transaction request, the second transaction request corresponding to the pending transaction between the first computing device and the second computing device and comprising a second set of transaction attributes corresponding to the pending transaction; when the first set of transaction attributes matches the second set of transaction attributes: identifying, by the consensus of the plurality of nodes, using at least one transaction attribute, a second blockchain; automatically executing, by the consensus of the plurality of nodes, a protocol to compare the second set of transaction attributes with data stored onto a ledger of the identified second blockchain; and, in response to determining that the second set of transaction attributes complies with data of the ledger of the identified second blockchain, appending, by the consensus of the plurality of nodes, a third block instance to the blockchain of the first computing device and a fourth block instance to the blockchain of the second computing device, the third block instance and the fourth block instance comprising data corresponding to the second transaction request.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and together with the specification, explain the invention.

DETAILED DESCRIPTION

Figure 1:
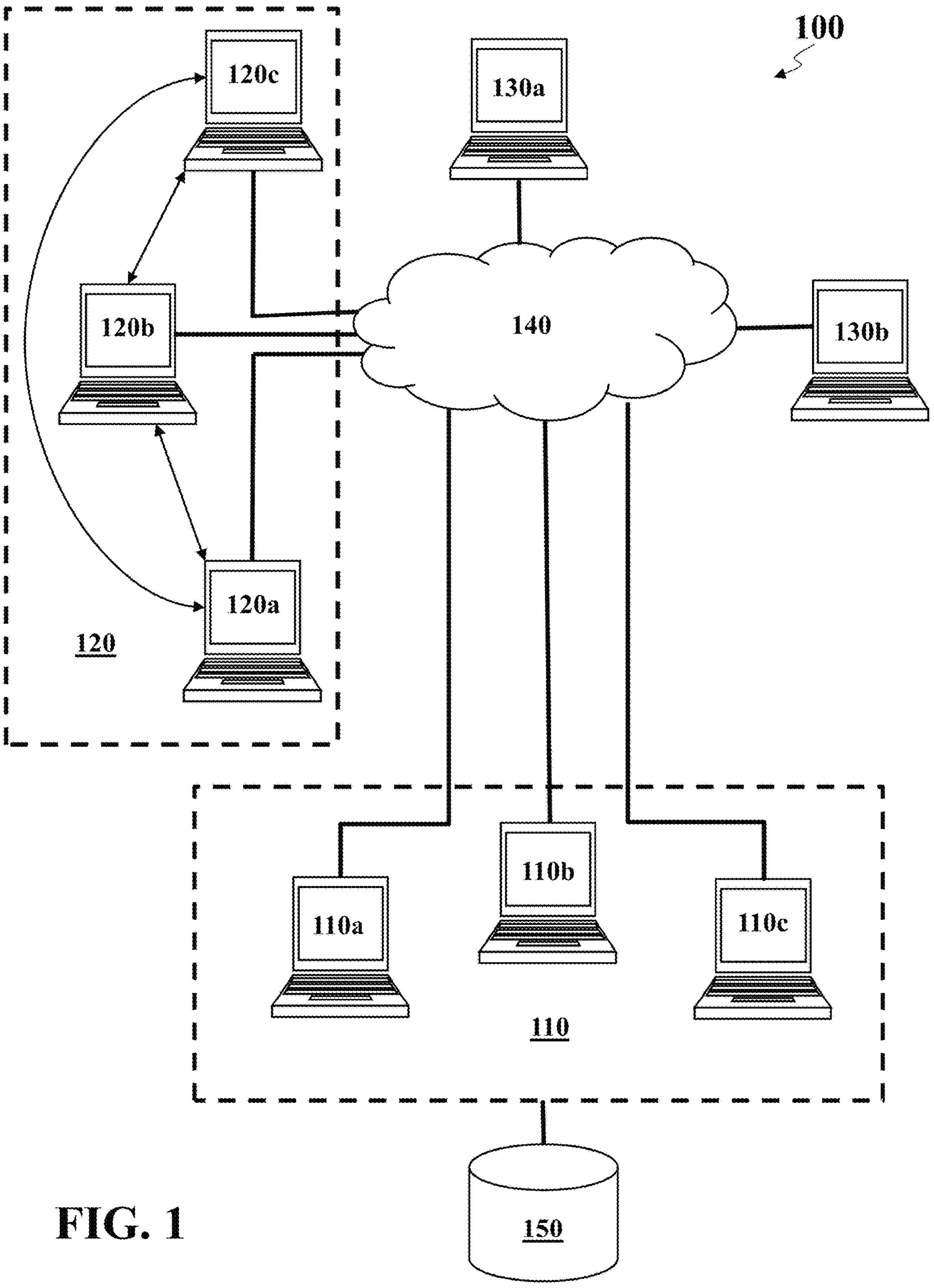
FIG. 1 illustrates an example of a computer system for maintaining the integrity of transactions across computing systems, according to an embodiment.

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for maintaining the integrity of transactions across computing systems, according to an embodiment. The system 100 may comprise a plurality of analytic nodes 110*a-c*, a plurality of peer nodes 120*a-c*, computing devices 130*a-b*, a network 140, and a system database 150. Aspects of the system 100 may be configured to employ and manage one or more system blockchains. Network 140 may be any synchronous or asynchronous network. A system blockchain may sometimes be referred to as a "distributed ledger," and may include blockchain-based distributed ledger software (e.g., Hyperledger, Ethereum, Openchain, and TerraLedger). The system blockchain may operate as a distributed database that stores data records associated with users and transaction documents, where the data records stored on the system blockchain may be blocks of data (e.g., block instances or blocks) that are hosted (e.g., locally stored or otherwise in possession of each analytic node 110*a-c* and/or each peer node 120*a-c*, such as being remotely hosted or hosted in a cloud) on analytic nodes 110*a-c* and/or peer nodes 120*a-c*. The analytic nodes 110*a-c* may store the same or similar records as the peer nodes 120*a-c*. For example, each of the peer nodes 120*a-c* may host a ledger of a distributed ledger that is maintained by peer nodes 120*a-c*. The analytic nodes 110*a-c* may each host a ledger of a distributed ledger that corresponds (e.g., has similar data) to the distributed ledger of the peer nodes 120*a-c*. In some embodiments, the analytic nodes 110*a-c* may generate duplicates of one or more block instances within a ledger of an analytic node 110*a-c* and store said block instances in the system database 150.

The analytic nodes 110*a-c* may generate and display a user interface on the computing devices 130*a-b* and/or the nodes of the peer nodes 120*a-c*. An example of the user interface generated and hosted by the analytic nodes 110*a-c* may be a website (such as the website illustrated in FIGS. 5 and 6). The analytic nodes 110*a-c* may be configurable administrative devices that analyze and maintain data of transactions between peer nodes 120*a-c*. The analytic nodes 110*a-c* may host a website accessible to end-users such as peer nodes 120*a-c* and/or computing devices 130*a-b*. The analytic nodes 110*a-c* may be any computing device comprising a processor and non-transitory machine-readable storage capable of executing the various tasks and processes described herein. Non-limiting examples of such computing devices may include workstation computers, laptop computers, server computers, laptop computers, and the like. Further and as described above, each of the analytic nodes 110*a-c* may be or include a server or multiple servers. Although three analytic nodes are shown, any number of analytic nodes may be utilized.

The analytic nodes 110*a-c* may execute software applications configured to display the user interface (e.g., host a website), which may generate and serve various webpages to the computing devices 130*a-b* and/or the peer nodes 120*a-c*. The webpages may be used to generate and access data stored on the system database 150 or a blockchain hosted or maintained by the peer nodes 120*a-c* and/or the analytic nodes 110*a-c*. In some implementations, the analytic nodes 110*a-c* may be configured to require user authentication based upon a set of user authorization credentials (e.g., username, password, biometrics, cryptographic certificate, and the like). In such implementations, the analytic nodes 110*a-c* may access a system database 150 configured to store user credentials, which the analytic nodes 110*a-c* may be configured to reference to determine whether a set of entered credentials (purportedly authenticating the user) match an appropriate set of credentials that identify and authenticate the user.

A computing device 130*a-b* may be any computing device that allows a user to interact with the analytic nodes 110*a-c* via a webpage generated by the analytic nodes 110*a-c*. The computing device 130*a-b* may execute an Internet browser or local application that accesses the analytic nodes 110*a-c* to issue requests or instructions to the analytic nodes 110*a-c* to access data of the system blockchain (e.g., transmit instructions to the analytic nodes 110*a-c*). The computing device 130*a-b* may transmit credentials from user inputs to the analytic nodes 110*a-c*. The analytic nodes 110*a-c* may authenticate the user and/or determine a user role based on their credentials. The computing device 130*a-b* may comprise any number of input devices configured to receive any number of data inputs, including various types of data allowing for authentication (e.g., username, passwords, certificates, and biometrics). The computing device 130*a-b* may be any computing device comprising a processor and non-transitory machine-readable storage medium allowing the computing device 130*a-b* to perform the various tasks and processes described herein.

As an example of the computing device 130*a-b* operation, the computing device 130*a-b* may execute an Internet browser that accesses a web page hosted by the analytic nodes 110*a-c* hosting a transaction website (or any other user interface). The transaction website may allow a user to upload a transaction record comprising a set of transaction attributes or otherwise input transaction attributes directly into the website. The transaction record may be for a transaction between two peer nodes 120*a-c* or two entities that are entering into a transaction being hosted by a peer node 120*a-c*. The computer files may be stored into document records in a system database 150, which may then be added to block instances of the system blockchain of the analytic nodes 110*a-c* and/or the peer nodes 120*a-c*, where the block instances are accessible according to various blockchain rules. The computing device 130*a-b* may issue queries or instructions to the analytic nodes 110*a-c* via the webpages generated by the analytic nodes 110*a-c*, which can cause the analytic nodes 110*a-c* to query the block instances on the peer nodes 120*a-c*, and, in some instances, perform various tasks, such as retrieving data from or transmitting data to the peer nodes 120*a-c*.

The analytic nodes 110*a-c* may generate and access blockchain instances that are hosted on peer nodes 120*a-c*, according to instructions received from the computing devices 130*a-b*, and/or any of the nodes of the peer nodes 120*a-c*. Software executed by the analytic nodes 110*a-c* may provide blockchain services to users interacting with the analytic nodes 110*a-c*. For example, the analytic nodes 110*a-c* may provide blockchain services to the peer nodes 120*a-c* or the computing devices 130*a-b* via the user interface provided to (e.g., displayed on) these computing devices. In some embodiments, the analytic nodes 110*a-c* may update and query records in the system database 150 according to instructions they receive from the peer nodes 120*a-c* or the computing device 130*a-b*. The analytic nodes 110*a-c* may then generate block instances for the system blockchain maintained by the peer nodes 120*a-c*, where the block instances contain data from transaction records of the system database 150 and/or transaction records received from any of the peer nodes 120*a-c*. The analytic nodes 110*a-c* may transmit instructions to the peer nodes 120*a-c* to update local instances of the system blockchain maintained by the peer nodes 120*a-c* with a block instance that corresponds to the respective transaction record.

In some embodiments, the analytic nodes 110*a-c* host and maintain a blockchain that corresponds to the blockchain that is maintained by the peer nodes 120*a-c*. The analytic nodes 110*a-c* may receive transaction data (e.g., transaction records including transaction attributes) from the peer nodes 120*a-c* and generate a block instance to append to a system blockchain that the analytic nodes 110*a-c* maintain. The system blockchain of the analytic nodes 110*a-c* may be the same or have similar blocks to the system blockchain that is maintained by the peer nodes 120*a-c*. In some embodiments, the system blockchain of the analytic nodes 110*a-c* may be encrypted or otherwise kept private from outside computing devices such as the peer nodes 120*a*-c. Consequently, outside computing devices may not be able to determine attributes of individual transaction records between peer nodes 120*a-c*.

The system database 150 can be a dynamic database that includes transaction records that the system database 150 receives from the peer nodes 120*a*-*c* and from various other sources (e.g., data source providers). The system database 150 can be a graph database, MySQL, Oracle, Microsoft SQL, PostgreSql, DB2, document store, search engine, key-value store, etc. The system database 150 may be configured to hold any amount of data and can be made up of any number of components. Transaction records stored in the system database 150 may comprise one or more data fields (e.g., attributes and/or attribute values) containing transaction-identifying hash values generated by the analytic nodes 110*a*-*c* according to a hashing algorithm implemented by the analytic nodes 110*a*-*c* and/or the peer nodes 120*a*-*c*. When a new transaction record containing a machine-readable computer file (e.g., PDF, DOC, XSL), is received, the analytic nodes 110*a*-*c* may store the new transaction record in the system database 150. The analytic nodes 110*a*-*c* may also generate a hash value for the new transaction record and store the hash value in the system database 150. The hash value may be a unique identifier for the particular transaction record, and may be used by various computing devices of the system 100, such as the system database 150, to reference the computer file or metadata describing the computer file. The computer file may be stored in the system database 150 and/or on a block instance of the system blockchain that is hosted on peer nodes 120*a*-*c* or the system blockchain that is hosted on analytic nodes 110*a*-*c*.

The system database 150 may be hosted on any number of computing devices comprising a non-transitory machine-readable storage medium and may be capable of performing the various tasks described herein. The system database 150 may be accessed by the analytic nodes 110*a*-*c* via a network.

The analytic nodes 110*a*-*c* may generate new block instances with timestamps or other data that links the new block instances with existing block instances on the blockchain. As an example, when the analytic nodes 110*a*-*c* generate a new transaction record in the system database 150 (after receiving the new transaction record), the analytic nodes 110*a*-*c* may generate a hash value for the transaction record based upon one or more attributes (e.g., terms) of the transaction record. The analytic nodes 110*a*-*c* may then generate and append a new block instance for the system blockchain of the analytic nodes 110*a*-*c* to the local instances of the blockchain stored within the analytic nodes 110*a*-*c* (or the system database 150). The analytic nodes 110*a*-*c* may transmit the new block instance (or data of the new block instance) to one or more of the peer nodes 120*a*-*c*. The peer nodes 120*a*-*c*, in turn, may append the newly generated block instance to the existing blockchain stored at the respective peer node 120*a*-*c*.

In some instances, to maintain the privacy of the attributes of a transaction between peer nodes 120*a*-*c*, the analytic nodes 110*a*-*c* may only transmit a hash or some other identifier of the data of a transaction record to the peer nodes 120*a*-*c*. Each of the peer nodes 120*a*-*c* may receive the hash or identifier and generate a block instance to append to their respective blockchain based on the hash (and a hash of the immediately previous blockchain to create a link). Consequently, the peer nodes 120*a*-*c* may not receive information about a private transaction between peer nodes from the analytic nodes 110*a*-*c* and such data may not be stored on the blockchain that is maintained by the peer nodes 120*a*-*c*. The peer nodes 120*a*-*c* associated with the transaction may store the attributes of the transaction in a local database, enabling such peer nodes 120*a*-*c* to access such attributes without the attributes being publicly available on the system blockchain of the peer nodes 120*a*-*c*.

The analytic nodes 110*a*-*c* or peer nodes 120*a*-*c* may generate block addresses for data to be retrieved from blockchain instances of the system blockchain of the analytic nodes 110*a*-*c* and/or the peer nodes 120*a*-*c*. To do so, the analytic nodes 110*a*-*c* or peer nodes 120*a*-*c* may generate a hash value for a transaction record, where the application uses the hash value or other identifier values as a block address to reference the file from the respective blockchain. The analytic nodes 110*a*-*c* or peer nodes 120*a*-*c* may generate the hash value for the transaction record by generating a hash based on the transaction record (e.g., based on all or a portion of the data of the transaction record) and the data of the immediately preceding block data or block address. This block address may then be stored into the system database 150 in a document record along with the transaction record and any number of additional data field entries related to the transaction record.

In operation, the analytic nodes 110*a*-*c* or peer nodes 120*a*-*c* may reference the blocks of their respective blockchains containing a file for a transaction according to the block address of the file. The analytic nodes 110*a*-*c* may generate any number of block addresses in a similar manner. Block addresses may be generated in any number of combinations of hashed block data and/or hashed block addresses from the new block and one or more preceding blocks, such that the address of the new block is dependent upon, or otherwise linked to, at least the immediately preceding block.

Peer nodes 120*a*-*c* may represent one or more institutions under the same corporate umbrella (e.g., each peer node 120*a*-*c* may be a computing device or group of computing devices of an affiliate of the same company). Peer nodes 120*a*-*c* may represent any group of computing devices (e.g., any group of computing devices that perform transactions with each other and maintain a blockchain for such transactions). Peer nodes 120*a*-*c* may be or may be a part of analytic nodes 110*a*-*c*. A peer node 120*a*-*c* may be any computing device comprising a processor and a non-transitory machine-readable storage medium capable of performing the various tasks and processes described herein. Non-limiting examples of a peer node may be a workstation computer, laptop computer, tablet computer, and server computer. Although three peer nodes are shown, any number of peer nodes may be utilized. Although the peer nodes 120*a*-*c* are described as storing blocks of the blockchain in FIG. 1, other computing devices, such as an analytic node 110*a*-*c*, may host blocks of the blockchain or host a corresponding blockchain. Each peer node 120*a*-*c* may locally store an instance of the system blockchain in the storage medium of the system blockchain, and may further execute a software application that instructs the peer node 120*a*-*c* on generating and querying blocks within the locally stored blockchain instance. In some embodiments, an analytic node 110*a*-*c* may be a peer node 120*a*-*c* or vice versa.

In operation, a peer node 120*a*-*c* may generate new block instances on a locally stored instance of the system blockchain maintained by the peer nodes 120*a*-*c* according to data received from an analytic node 110*a*-*c* or other peer nodes 120*a*-*c*. In some instances, the analytic nodes 110*a*-*c* may generate a new local block instance stored on the analytic nodes 110*a*-*c* (e.g., within the system database 150), and then instruct one or more of the peer nodes 120*a*-*c* to update the blockchain stored in their local storage (e.g., local database). Moreover, the analytic nodes 110*a*-*c* may query the block instances of the system blockchain of the peer nodes 120*a-c* according to a block address stored in the system database 150. When the analytic nodes 110*a-c* execute the query of the blocks on the system blockchain, the analytic nodes 110*a-c* may poll the peer nodes 120*a-c* to determine the most recent data on the system blockchain (e.g., latest valid blockchain).

The analytic nodes 110*a-c* may ensure that the data at a block of the system blockchain of the peer nodes 120*a-c* is accurate by using a voting mechanism encoded within the blockchain software executed by the analytic nodes 110*a-c* and/or the peer nodes 120*a-c*. Each peer node 120*a-c* may receive, from the analytic nodes 110*a-c* or the other peer nodes 120*a-c* a query for a block instance and a block address and return a response to the analytic nodes 110*a-c* and/or the peer nodes 120*a-c* indicating whether the block address contains the data that matches data of a corresponding block instance of a quorum (e.g., a majority or a predetermined percentage) of the peer nodes 120*a-c*. Responsive to a determination that the data matches a quorum, the analytic nodes 110*a-c* and/or the peer nodes 120*a-c* may append the block instance to the blockchain that they maintain. The analytic nodes 110*a-c* and/or the peer nodes 120*a-c* may select this method to combat possible fraud and to be certain that data in the blockchain that they maintain is resistant to corruption, as each block instance on each and/or the peer nodes 120*a-c* would need to be corrupted in the same way for a possible security breach. In this way, the analytic nodes 110*a-c* and/or the peer nodes 120*a-c* may also be prevented from acting on obsolete data. For instance, a peer node 120*a-c* may attempt to modify information about a transaction with another peer node 120*a-c*. By modifying the information within the block instance, the hash value of said block instance may change, which would result in the block instance being disconnected from other block instances within the blockchain. Furthermore, when queried by the analytic nodes 110*a-c* and/or the peer nodes 120*a-c*, other peer nodes 120*a-c* may indicate that the modified block instance does not match a version of the data stored on their respective nodes. As a result, the analytic nodes 110*a-c* and/or the peer nodes 120*a-c* may determine that the modified block instance has been indeed been tampered with. The analytic nodes 110*a-c* and/or the peer nodes 120*a-c* may then refuse to use the modified block instance. The analytic nodes 110*a-c* may implement a similar voting mechanism to append block instances to the system blockchain of the analytic nodes 110*a-c*.

Before generating a new block instance for a transaction between peer nodes 120*a-c*, the analytic nodes 110*a-c* may verify that each peer node 120*a-c* of the transaction generated a transaction record (e.g., a contract) with matching attributes to the transaction record of the other peer node 120*a-c* of the transaction. For example, when two peer nodes 120*a-c* initiate a transaction, one or both of the peer nodes 120*a-c* may generate a transaction record that has various attributes of the transaction and values for the attributes. Examples of different attributes include, but are not limited to, transaction type (e.g., loan, debt, sum, debt, cash, etc.), length, start date, end date, amount, transacting peer, basis, points, currency, maturity date, treasury rate, customer rate, portfolio, broker, benchmark, etc. The two peer nodes 120*a-c* may initiate the transaction by receiving a transaction request, a transaction record and/or attributes of a transaction from a respective computing device 130*a-b* through the website. The peer nodes 120*a-c* of the transaction may each transmit the respective transaction records that they receive for the transaction to the analytic nodes 110*a-c*. In some embodiments, the peer nodes 120*a-c* may transmit an indication or identification (e.g., a transaction request) to the analytic nodes 110*a-c* indicating that the transaction was initiated (e.g., that the respective peer node 120*a-c* generated a transaction record for the transaction). In some cases, the indication may include a transaction record generated by the transmitting peer node 120*a-c* for a pending transaction. In cases in which the transaction request does not include such a transaction record, the analytic nodes 110*a-c* may receive the indication and retrieve the transaction record from the peer node 120*a-c* that transmitted the indication. The analytic nodes 110*a-c* may receive or retrieve the transaction record of each peer node 120*a-c* of the transaction and compare the corresponding attributes between the transaction records. Responsive to determining the attributes match, the analytic nodes 110*a-c* may generate a block instance including data of the transaction and append (described in detail with respect to FIG. 2) the block instance to the system blockchain that the analytic nodes 110*a-c* maintain.

Responsive to the analytic nodes 110*a-c* determining that not all of the attributes match, the analytic nodes 110*a-c* may transmit an indication to the peer nodes 120*a-c* of the transaction indicating that the two peer nodes 120*a-c* generated transaction records with differing attributes. The indication may include a description or a list of the attributes that differed between the transaction records. The peer nodes 120*a-c* of the transaction may receive the indication and communicate with each other to obtain the correct values for the attributes. Upon determining the correct values, the respective peer nodes 120*a-c* may each generate a new transaction record and transmit the transaction record (or an indication of the transaction record) to the analytic nodes 110*a-c*. The analytic nodes 110*a-c* may again compare the attributes and repeat the process until the peer nodes 120*a-c* of the transaction generate transaction records with matching attributes.

In addition to or instead of appending a block instance with data of the transaction to the system blockchain that is maintained by the analytic nodes 110*a-c*, the analytic nodes 110*a-c* may transmit instructions to the peer nodes 120*a-c* of the transaction indicating to append a block instance containing transaction data for the transaction to the system blockchain that is maintained by peer nodes 120*a-c*. The instructions may include a flag or setting that causes the peer nodes 120*a-c* of the transaction to generate a block instance based on data of the transaction and append the generated block instance to a local instance of the system blockchain that is stored at the respective peer node 120*a-c*.

The peer nodes 120*a-c* of the transaction may receive such instructions and generate a private block instance to append to the local instance of the blockchain. The peer nodes 120 *a-c* may do so to prevent others within the system 100 from accessing the data of a transaction record. To generate the private block instances, depending on their configuration, the peer nodes 120*a-c* of the transaction may encrypt or generate a hash of the data or a portion of the data of the transaction record. The peer nodes 120*a-c* may encrypt the data with a symmetric key or a public key to which only the encrypting peer node 120*a-c* that has the corresponding key (symmetric key or private key) may decrypt the encrypted data. The peer nodes 120*a-c* may each maintain a copy of the transaction record they generated in a local database to maintain a copy of the attributes of the transaction. The local database may be inaccessible (e.g., maintained in a secure environment) to other peer nodes 120*a-c* to keep the details of the transaction private. Once the data of the transaction has been encrypted or hashed, the peer nodes 120_a-c_ of the transaction may append a block instance containing the encrypted or hashed data (and any unencrypted or unhashed transaction data from the transaction record) to a local instance of the blockchain and propagate the data used to generate the block instance or an instance of the block instance itself to the other peer nodes 120_a-c_. Each peer node 120_a-c_ may receive the data or the block instance and append a corresponding block instance to their respective local instance of the blockchain. Consequently, the peer nodes 120_a-c_ of a transaction may maintain privacy of the attributes of transactions that they perform with each other while maintaining the integrity of the transactions for which they generate block instances.

When communicating about a pending transaction, the peer nodes 120_a-c_ of the transaction may communicate through a private channel that is not accessible to the peer nodes 120_a-c_ that are not privy to the transaction. The peer nodes 120_a-c_ of the transaction may gain access to the private channel by being authenticated and authorized by another computing device, such as by the analytic nodes 110_a-c_. In some embodiments, the communication between the peer nodes 120_a-c_ of a private channel may be encrypted so outside computing devices such as other peer nodes 120_a-c_ may not access or eavesdrop such communication. There may be private channels between each permutation of the peer nodes 120_a-c_. Via their respective private channels, peer nodes 120_a-c_ may initiate transactions and confirm attributes for the transaction. Once each peer node 120_a-c_ of the transaction agrees on the attributes, each of the peer nodes 120_a-c_ of the transaction may generate a transaction record and send it to the analytic nodes 110_a-c_ as described above. Responsive to receiving an alert indicating that the transaction records do not match, the peer nodes 120_a-c_ of the transaction may communicate over the same private channel to determine which attributes of the transaction need to be updated. Advantageously, by communicating via private channels, the peer nodes 120_a-c_ may keep the attributes of their respective transaction private from each other.

The system blockchain that is maintained by the peer nodes 120_a-c_ may comprise regulation block instances. Regulation block instances may be block instances that include rules and/or thresholds for transactions that are individually associated with one or more of the peer nodes 120_a-c_. For example, a regulation block for a peer node 120_a-c_ may have a rule that no transactions may go through where the peer node 120_a-c_ takes on a debt with an interest rate that exceeds 7%. In another example, a regulation block for a peer node 120_a-c_ may have a rule where the respective peer node 120_a-c_ may not provide any loans to other peer nodes 120_a-c_. Each regulation block may be private so only the peer nodes 120_a-c_ that are associated with or use the regulations of the respective regulation may access or view such regulations. Such regulation blocks may only contain such rules and regulations as its data in addition to any hashes that link the regulation block with other blocks of the blockchains. Regulation blocks may be linked to other regulation blocks or transaction blocks.

After verifying that the transaction records between two peer nodes 120_a-c_ match and before transmitting instructions indicating the match to any of the peer nodes 120_a-c_, the analytic nodes 110_a-c_ may compare the attributes or set of transaction attributes of the transaction records to regulation blocks that are associated with or corresponds to each peer node 120_a-c_ of the transaction. For example, the analytic nodes 110_a-c_ may identify the peer nodes of the transaction record based on peer node identifiers in the transaction records. The peer node identifiers may be attributes of the transaction. The analytic nodes 110_a-c_ may identify block instance addresses of the regulation blocks that are associated with the peer nodes 120_a-c_ of the transaction by comparing the peer node identifiers to a look-up table and identifying the address of the corresponding regulation block instance. The analytic nodes 110_a-c_ may compare the attributes of the corresponding transaction records generated by the peer nodes 120_a-c_ of a transaction to the regulation blocks of the respective peer nodes 120_a-c_. Responsive to determining that the attributes of one or each of the transaction records comply with the rules and/or thresholds of the respective regulation blocks, the analytic nodes 110_a-c_ may transmit a signal to the peer nodes 120_a-c_ indicating the transaction is verified and/or to generate a block instance based on the transaction. In embodiments in which the analytic nodes append block instances to a blockchain based on transactions between peer nodes 120_a-c_, in some cases, the analytic nodes 110_a-c_ may only do so responsive to determining transaction attributes of the transaction comply with the rules and/or thresholds of the regulation blocks of each peer node 120_a-c_ of the transaction.

Responsive to one or each of the attributes of the transaction records not complying with the rules or regulations of the regulation blocks, however, the analytic nodes 110_a-c_ may transmit an alert to the peer nodes 120_a-c_ of the transaction indicating an error. In some cases, the alert may indicate which attribute does not comply with a rule or threshold. The analytic nodes 110_a-c_ may only identify the rule or threshold to the peer node that is associated with the attribute that does not comply with it. The other peer node 120_a-c_ of the transaction may just receive an alert indicating that there was an error. Consequently, the rules and thresholds of each peer node 120_a-c_ may remain private.

Each peer node 120_a-c_ may host and maintain its own internal blockchain with nodes internal to the respective peer node 120_a-c_. The internal blockchain may store a record of transactions that are performed by the respective peer node 120_a-c_. The internal blockchain may also include regulation blocks for the respective peer node 120_a-c_ as described above. In such embodiments, upon determining that two peer nodes have generated matching transaction records, the analytic nodes 110_a-c_ may identify the blockchain address for an internal blockchain maintained by the peer nodes 120_a-c_ of the transaction based on identifiers in the respective transaction records for the transaction along with the block instance addresses of the regulation block similar to the above. The analytic nodes 110_a-c_ may verify (e.g., compare) each transaction record against the respective rules and/or thresholds of the regulation blocks of the internal blockchains. In some embodiments, upon verifying a transaction, the analytic nodes 110_a-c_ may transmit instructions to the peer nodes 120_a-c_ to generate a block instance comprising data for the transaction. Each peer node 120_a-c_ of the transaction may append a corresponding block instance to its internal blockchain in addition to or instead of the system blockchain maintained between peer nodes 120_a-c_.

In one embodiment, when a first peer node 120_a-c_ agrees to the terms of a transaction with a second peer node 120_a-c_, the first peer node 120_a-c_ may execute a first smart contract protocol to append a block instance with a first set of transaction attributes to an internal or local blockchain of the first peer node 120_a-c_. The first peer node 120_a-c_ may execute a second smart contract protocol to append a block instance with the first set of transaction attributes to an internal or local blockchain that is maintained by the second peer node 120*a-c*. The second peer node 120*a-c* may generate a second set of transaction attributes for the transaction and compare the second set of transaction attributes to the first set of transaction attributes of the corresponding block instance in the blockchain of the second peer node 120*a-c*. Responsive to determining that the first set of transaction attributes match, the second peer node 120*a-c* may append a block instance for the transaction to the blockchain of the second peer node 120*a-c*. The second peer node 120*a-c* may communicate that the sets of transaction attributes matched to the first peer node 120*a-c*. The first peer node 120*a-c* can accordingly append a corresponding block instance to the blockchain maintained by the first peer node 120*a-c*. In some embodiments, some or all of these steps may be performed by the analytic nodes 110*a-c* (or a consensus of the analytic nodes 110*a-c*).

The process performed by the analytic nodes 110*a-c* to verify transactions between peer nodes 120*a-c* may be performed by a consensus of the analytic nodes 110*a-c*. A consensus may be a majority, all, or a number above a predetermined threshold (which may be set and adjusted by an administrator) of the analytic nodes 110*a-c*. In some embodiments, a consensus may only be one of the analytic nodes 110*a-c* or may be a server. The analytic nodes 110*a-c* may each perform the process to verify the validity of a transaction between peer nodes 120*a-c*. Responsive to a consensus of the analytic nodes 110*a-c* determining that the transaction records between peer nodes 120*a-c* of a transaction match, the consensus of the analytic nodes 110*a-c* may append a block instance for the transaction to the system blockchain that they maintain or transmit instructions to the peer nodes 120*a-c* to cause such block instances to be appended to the blockchains maintained by the peer nodes 120*a-c* and/or their internal blockchains.

Figure 2:
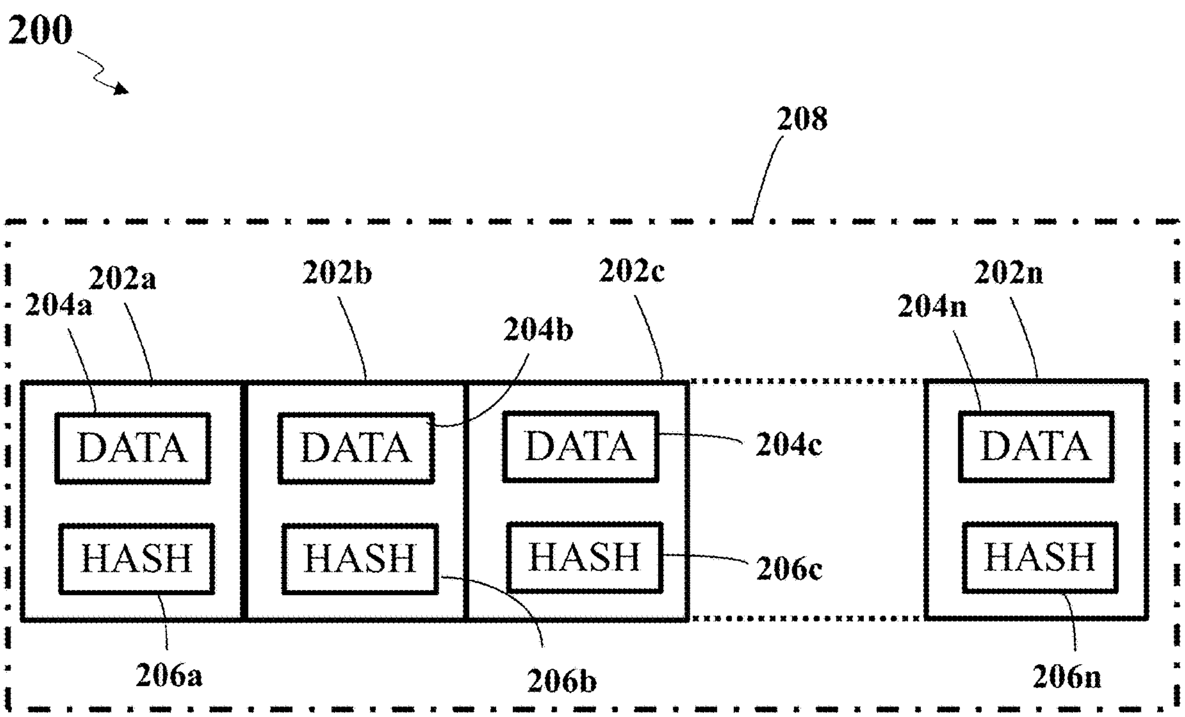
FIG. 2 graphically illustrates an example of appending multiple block instances, according to an embodiment.

Referring now to FIG. 2, an example of a system blockchain comprising different block instances is illustrated. As depicted in FIG. 2, a blockchain 208 comprising block instances 202*a*-202*n* (collectively 202) may include data 204*a*-204*n* (collectively 204) that enables information, such as transaction data (e.g., transaction attributes and values), machine-readable code/documents, and other metadata associated with one or more transactions of the peer nodes described above. The block instances 202 may also contain hash values 206*a*-206*n* (collectively 206) that are used to link each of the block instances to the preceding block instance, as understood in the art.

Analytic nodes or peer nodes may generate (or instruct a blockchain service to generate) the block instance 202*a* (e.g., the genesis block). The analytic nodes may receive data 204*a* from a first peer node or a first computing device via a GUI provided by the analytic nodes on the first computing device or peer node. For example, an administrator using the first computing device may log in to a website hosted or otherwise associated/managed by the analytic nodes and transmit data 204*b* (e.g., a transaction record) to the analytic nodes. The analytic nodes may verify the data 204*b* against data of a corresponding transaction record. Responsive to determining the data matches (and in some cases determining the data complies with the rules and/or thresholds of corresponding regulation blocks), the analytic nodes may generate a block instance for the blockchain that they maintain. The analytic nodes may also or instead transmit instructions to the peer nodes to generate a corresponding block instance and append the block instance to the blockchain that the peer nodes maintain by identifying a quorum and as described herein. Upon generation of the block instance 202*b*, the analytic nodes may generate the hash value 206*b* based on the data 204*b* (and/or data of the immediately previous block instance), an identifier of the first computing device, other identifier information (e.g., time stamp and/or geolocation), and/or a reference to the system database associated with the analytic nodes.

The analytic nodes or peer nodes may also generate (or instruct a blockchain service to generate) the block instance 202*c*. The analytic nodes or peer nodes may receive data 204*c* from a second computing device (e.g., a second peer node) via a GUI provided by the analytic nodes on the second computing device. For example, an administrator using the second computing device may log in to a website hosted or otherwise managed by the analytic nodes and the second computing device may transmit data 204*c* to the analytic nodes. The analytic nodes or peer nodes may generate a hash value 206*c* based on the data 204*c*, an identifier of the second peer node, other identifier information (e.g., time stamp and/or geolocation), and/or a reference to the system database associated with the analytic nodes.

The hash value 206*c* may be based on the hash value 206*b* and/or the data 204*c*. The analytic nodes may incorporate the hash value 206*b* into the hash value 206*c* to append the block instance 202*c* to the block instance 202*b*. The analytic nodes may subsequently poll all the peer nodes to ensure the highest integrity of the blockchain by appending the latest block instance to the latest valid blockchain instances (e.g., the last blockchain for which there was a quorum). Using this method, blockchain instances within the blockchain 208 may be appended to the preceding blockchain instance. The analytic nodes may generate block instances 202*c-n* using the same methods explained above to continuously update the blockchain 208. As depicted, block instances 202*a*, 202*b*, 202*c*, and 202*n* are connected because of synchronization of hash values 206*a*, 206*b*, 206*c*, and 206*n*.

In some configurations, additional information, such as an identifier associated with peer nodes adding or updating the data could also be included within the blockchain or incorporated into the hash value. As an example, if a peer node adds any data to the blockchain, an identifier associated with the computing device that contributed to creating the data may be included in the respective block. In some embodiments, the identifier may include a time stamp (e.g., data regarding the time of data modification or creation) and/or a geolocation (e.g., data regarding the location within which the data modification or creation has occurred or has a value based on the user's geo-location). The identifier may also be incorporated within the hash value and may be used by the analytic nodes as a part of the hashing algorithm. Such identification information may be used as a veracity scale factor that the information is true and accurate.

The analytic nodes may transmit the blockchain instances to all the peer nodes of the blockchain to preserve the integrity of the blockchain. For example, the analytic nodes may transmit the hash value 206*c* (e.g., the hash value generated for block instance 202*c* based on data 204*c* received from a third node) to the first node (e.g., the first computing device associated with the block instance 202*a*) and the second node (e.g., the second computing device associated with the block instance 202*b*). Consequently, when the nodes of the blockchain are polled, they will not verify the modified block.

Modification of data within a block instance may disconnect that block instance from the blockchain. The analytic nodes may use this method to combat possible fraud or unauthorized modification of the data within blockchain instances. For example, if the second administrator using the second computing device modifies data 204*b* within block instance 202*b*, the hash value 206*b* will also be modified. As explained above the hash value 206*b* may be based on (or at least partially based on) data 204*b*; therefore if data 204*b* is modified, hash value 206*b* will also be modified. Modification of the data 204*b* or the hash value 206*c* may break the link between block instance 202*b* and block instance 202*c* because hash value 206*c* is at least in part generated based on hash value 206*b*.

Figure 3:
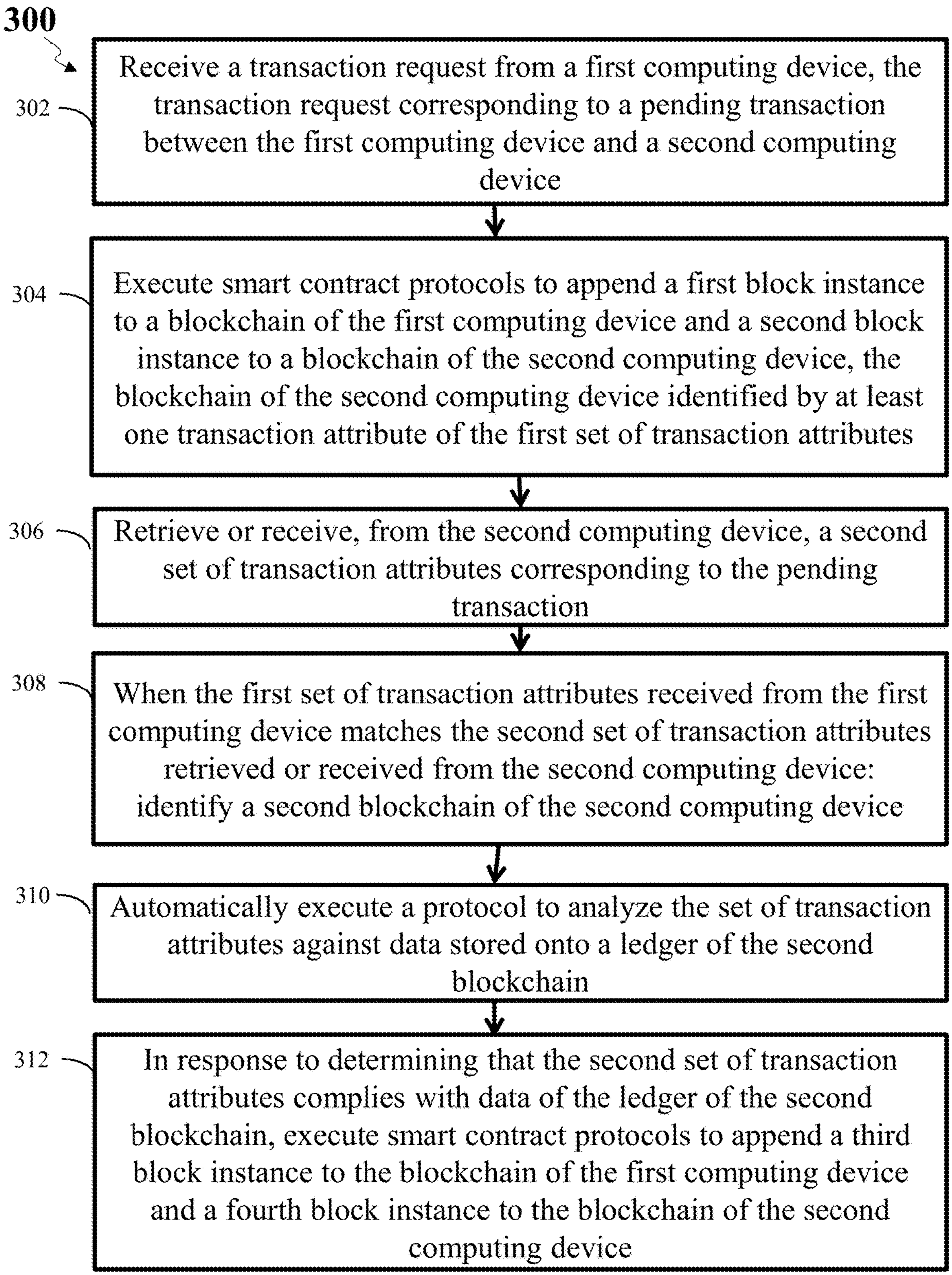
FIG. 3 illustrates a flowchart depicting operational steps for maintaining the integrity of transactions across computing systems, according to an embodiment.

FIG. 3 illustrates execution of a method 300 for maintaining the integrity transactions across computing systems, according to an embodiment. Other embodiments of executing the method 300 may comprise additional or alternative steps, or may omit some steps altogether. Each of the steps of the method 300 may be performed by one or a combination of the analytic nodes, a first computing device, or a second computing device.

At step 302, the analytic nodes (or a consensus of the analytic nodes) may receive a transaction request from a first computing device. The transaction request may correspond to a pending transaction between the first computing device and a second computing device. The first computing device and the second computing device may be peer nodes of a group of peer nodes that operate to maintain a blockchain that stores data from transactions (e.g., data of transaction records) between the first and second computing devices. There may be any number of peer nodes in the group of peer nodes. As explained above, the analytic nodes may generate a graphical user interface to provide transaction record services to the first and second computing devices. In an embodiment, the graphical user interface may be a website hosted by the analytic nodes, which is available to the peer nodes. The purpose of said website may be to collect transaction data such as data in transaction records, and provide a platform to securely upload transaction data, and/or possibly retrieve transaction data from the peer nodes. The graphical user interface may act as an intermediary between different peer nodes involved in a transaction and may be a central and "one-stop" website for facilitating transactions between peer nodes, storing data of the transactions, and/or retrieving such data. While the described graphical user interface is described herein as a central management tool, neither the analytic nodes nor the graphical user interface deviate from the spirit of the distributed nature of the blockchain technology. The analytic nodes provide a management tool to reduce the computational burden of keeping record within different and unrelated databases; blockchain instances may be stored in individual peer node databases.

Peer nodes may communicate with each other across a private channel. The peer nodes may access the private channel via the website provided by the analytic nodes. Each peer node may have a private channel with each other peer node to facilitate communications for transactions without the other peer nodes being able to view or access the communications within the channel. The communications on the private channel may be encrypted so only the members of the private channel may read and transmit data between each other via the private channel. For example, Peer Node A may initiate a transaction with Peer Node B. Peer Node A may transmit a message to Peer Node B across their private channel that only they can access to initiate communications for the transaction. Peer Node B may receive the message and communicate back so each of the peer nodes may negotiate terms or attributes for the communication without any other peer node having access to the communications.

The analytic nodes may be administrative nodes that maintain a blockchain comprising data of the transactions between the peer nodes. As described herein, the analytic nodes may verify the data of the transactions and, upon verification, append block instances comprising the data of the transactions to the blockchain.

The first computing device may transmit a transaction or verification request to the analytic nodes in response to reaching an agreement with the second computing device. The first computing device may generate a transaction record (e.g., a transaction request) that corresponds to the pending transaction between the first and second computing devices. The transaction record may comprise transaction attributes or a set of transaction attributes as described above. The first computing device may generate the transaction record automatically based on the agreement between the first computing device and the second computing device or in response to receiving manual user inputs comprising the attributes associated with the transaction. The first computing device may format the transaction record according to the attributes and include the transaction record in the transaction or verification request to the analytic nodes. In some embodiments, the first computing device may also store a copy of the transaction record in a local database that may be encrypted so it is only accessible to the first computing device.

Further, upon reaching an agreement with the first computing device for a transaction, the second computing device may also generate a transaction record that corresponds to the transaction. The second computing device may generate the transaction record in a similar manner to the first computing device and store the transaction record in a secure local database (per the above). In some embodiments, the second computing device may transmit the generated transaction record to the analytic nodes for further processing.

At step 304, the analytic nodes (or a consensus of the analytic nodes) may execute smart contract protocols to append a first block instance to a blockchain of the first computing device and a second block instance to a blockchain of the second computing device. To do so, the analytic nodes may execute a first smart contract protocol to append a block instance to the blockchain of the first computing device. The blockchain of the first computing device may be a ledger that is shared among the nodes of the first computing device or the entity that controls or operates the first computing device. In some embodiments, the blockchain of the first computing device is a local instance of a blockchain that is maintained by the analytic nodes and/or the first and second computing devices. The analytic nodes may append the first block instance to the blockchain of the first computing device based on the hash of the previous block instance, the data of the transaction (e.g., the set of transaction attributes), a timestamp, and/or any other data.

The analytic nodes may identify the blockchain of the second computing device based on the first set of transaction attributes. The first set of transaction attributes may include a transaction attribute identifying the blockchain of the second computing device and/or the entity that controls or operates the second computing devices. For example, the transaction attribute may be a blockchain address that points to the blockchain of the second computing device. The analytic nodes may identify the blockchain address from the transaction attributes to identify the blockchain of the second computing device.

The analytic nodes may execute a second smart contract protocol to append the second block instance corresponding to the first set of transaction attributes (e.g., the pending transaction) to the blockchain of the second computing device. The blockchain of the second computing device may be similar to the blockchain of the first computing device. For example, the blockchain of the second computing device may be a blockchain maintained by nodes of the second computing device or a local instance of a blockchain that is maintained by the analytic nodes and/or the first and second computing devices. The analytic nodes may do so based on the hash of the previous block of the blockchain of the second computing device and other data similar to the block instance that the analytic nodes append to the blockchain of the first computing device.

At step 306, the analytic nodes (or a consensus of the analytic nodes) may retrieve or receive a second set of transaction attributes corresponding to the pending transaction from the second computing device. The analytic nodes may receive the transaction record from the first computing device and retrieve a corresponding transaction record from the local database of the second computing device. The analytic nodes may retrieve the transaction record by transmitting a request to the second computing device or by transmitting instructions to the second computing device indicating for the second computing device to transmit its transaction record for the transaction. The second computing device may receive the request or instructions, retrieve or receive the second transaction record, and transmit the transaction record to the analytic nodes. The transaction record generated by the second computing device may comprise the second set of transaction attributes for the pending transaction between the first computing device and the second computing device.

In some embodiments, both the first and the second computing devices transmit their respective transaction records to the analytic nodes. In such embodiments, the analytic nodes may match the transaction records together as being associated with the same transaction based on a matching identifier (e.g., a transaction identifier specific to the transaction) between the transaction records.

In some embodiments, the analytic nodes may retrieve the second set of transaction attributes from a block instance that the analytic nodes or the first or second computing device appends to the blockchain of the second computing device. For example, the consensus of the analytic nodes or the second computing device may execute a smart contract protocol to append a block instance with the second set of transaction attributes that corresponds to the transaction to the blockchain of the second computing device. The analytic nodes may receive or retrieve the second set of transaction attributes from the appended block instance.

At step 308, the analytic nodes (or a consensus of the analytic nodes) may identify a second blockchain using a transaction attribute from the first set of transaction attributes. The second blockchain may be associated with the pending transaction (e.g., the second blockchain may be maintained by a peer node of the transaction). The analytic nodes may do so when the analytic nodes determine that the first set of transaction attributes received from the first computing device matches the second set of transaction attributes retrieved or received from the second computing device. The analytic nodes may identify the transaction attributes of the transaction record generated by the first computing device (e.g., the first set of transaction attributes) and the transaction attributes of the transaction record generated by the second computing device (e.g., the second set of transaction attributes). The analytic nodes may compare the corresponding transaction attributes of the first and second sets of transaction attributes. The analytic nodes may determine the first and second sets of transaction attributes match if each attribute of the sets of transaction attributes is the same as the corresponding transaction attribute of the other set of transaction attributes. For example, the analytic nodes may determine that a transaction start date of one set of transaction attributes matches the transaction start date of another set of transaction attributes if they have the same values. The analytic nodes may perform a similar comparison for each corresponding transaction attribute of the sets of transaction attributes. Responsive to each corresponding transaction attribute matching, the analytic nodes may use an address transaction attribute of the second set of transaction attributes to identify a second blockchain.

Responsive to determining that at least one transaction attribute between the first and second sets of transactions does not match, the analytic nodes may transmit a message or an alert to the first and/or second computing devices indicating there is a problem. The message may be a general message that indicates an error occurred or a message that comprises a list of attributes that did not match. The first and/or second computing devices may receive the message and communicate with each other, such as via their private channel, to identify the differences between the corresponding transaction attributes. The first and/or second computing devices may each generate a new transaction record for the transaction and transmit their respective transaction records to the analytic nodes for comparing. The analytic nodes may receive or retrieve the new transaction records from the first and/or second computing devices and determine if they have matching attributes. The analytic nodes and the first and second computing devices may repeat this process until the analytic nodes determine the sets of the transaction attributes of the transaction records match.

In some embodiments, the analytic nodes compares the second set of transaction attributes to the first set of transaction attributes that is stored in a block instance of the blockchain or ledger of the second computing device. The analytic nodes may receive or retrieve the second set of transaction attributes and receive or retrieve the first set of transaction attributes from the second block instance of the blockchain of the second computing device that corresponds to the pending transaction. The analytic nodes may determine if the second set of transaction attributes match (e.g., are the same as) the first set of transaction attributes based on a comparison between corresponding transaction attributes of the sets of transaction attributes.

In some embodiments, the analytic nodes determine whether transaction attributes match based on the types of the transaction attributes. As described above, the types of the attributes may include transaction type (e.g., loan, debt, sum, debt, cash, etc.), length, start date, end date, amount, transacting peer, basis, points, currency, maturity date, treasury rate, customer rate, portfolio, broker, benchmark, etc. Each transaction type may include a matching relationship, which may be stored in a database that is maintained or accessible to the analytic nodes. The matching relationship may indicate whether the values associated with corresponding attributes need to be the same to match or whether the values need to be different to match. For example, the matching relationship for a start date transaction attribute may indicate the start dates between two sets of attributes needs to be the same. In another example, a transaction type for one set of transaction attributes may be a loan. A matching transaction type to the loan may be a debt. While the strings of “loan” and “debt” may not be the same, the loan and debt strings may be mapped together in the database accessed by the analytic nodes. The analytic nodes may identify the match by comparing the values to the database. In another example, the attributes may match if they have opposite values to each other. For example, a negative loan amount may match a positive debt amount because one party is gaining money while the other party is lending money.

Upon determining the sets of transaction attributes match, the analytic nodes may identify a transaction attribute from one or both sets of transaction attributes that identifies a second blockchain. The second blockchain may be a system blockchain that the first and second computing devices maintain with other peer nodes or an internal blockchain that the first or second computing device maintains with another set of nodes or computing devices. In some embodiments, the second blockchain may be the blockchain of the first computing device and/or the blockchain of the second computing device or a separate blockchain maintained by the first or second computing device. The transaction attribute may be a pointer to the second blockchain. The analytic nodes may use the pointer to view and/or access the data of the second blockchain such as data of a ledger of the second blockchain. In embodiments in which the analytic nodes identify internal blockchains of the first and second computing devices, the analytic nodes may identify the internal blockchains of each of the first and second computing devices. Otherwise, the analytic nodes may identify the blockchain that is hosted and/or maintained by the first and second computing devices together and, in some cases, with other nodes or computing devices.

In some embodiments, the transaction attribute or another transaction attribute of the set of transaction attributes identifies a block instance within the second blockchain. For example, the transaction attribute may be a block instance address. The analytic nodes may identify the block instance address and access the data of the block associated with the block instance address.

The transaction attribute may point to a regulation block. A regulation block may be a block instance within the second blockchain that contains data identifying rules and/or thresholds with which transactions must comply. Regulation blocks may be specific to a computing device or node and may be kept private from other computing devices or nodes such as through encryption. Each set of transaction attributes may have a transaction attribute that points to a regulation block that is specific to the computing device that generated the set of transaction attributes. For example, a computing device may generate a regulation block indicating rules and thresholds for transactions that the computing device performs. The computing device can encrypt the regulation block and append it to the blockchain that is maintained by the other members of a group of computing devices. The analytic server may identify the regulation block generated by the computing device responsive to the computing device transmitting a transaction record or set of transaction attributes to the analytic server and determine the set of transaction attributes match a corresponding set of transaction attributes.

At step 310, the analytic nodes may automatically execute a protocol to compare the second set of transaction attributes with data stored onto a ledger of the second blockchain. The protocol may be stored instructions that cause the analytic nodes to compare the transaction attributes to the regulation blocks of the ledger of the second blockchain. The second blockchain may comprise a list of the transactions that are performed by the nodes of the second blockchain and/or the regulation blocks that were established by the nodes. The ledger may be the ledger of the second computing device. The ledger may be the ledger of any node that maintains the second blockchain.

The analytic nodes may compare the second set of transaction attributes to the rules and/or thresholds of the regulation block of the second blockchain that corresponds to the second computing device. For example, the regulation may comprise a rule indicating that the second computing device cannot give out a loan with more than five points or that has an interest rate lower than 4%. The analytic nodes may compare the point transaction attribute and the interest rate transaction attribute of the second set of transaction attributes to these rules and determine if they comply with the regulation block. The regulation blocks may have any rule or threshold for any number of transaction attributes.

The analytic nodes may perform a similar process for the first set of transaction attributes. The analytic nodes may identify the second blockchain (which may be the same as the blockchain identified for the first set of transaction attributes) associated with the first set of transaction attributes and the regulation block instance that is associated with the first computing device. The analytic nodes may compare the attributes of the first set of transaction attributes to the regulation block and determine whether the first set of transaction attributes complies with the respective regulation block.

At step 312, the analytic nodes may execute smart contract protocols to append a third block instance to the blockchain of the first computing device and a fourth block instance to the blockchain of the second computing device. The third block instance and the fourth block instance may comprise data corresponding to the transaction request. The analytic nodes may append the third block instance to the blockchain of the first computing device in response to determining that the second set of transaction attributes complies with data of the ledger of the identified second blockchain. The analytic nodes may determine that the second set of transaction attributes complies with the data of the ledger responsive to determining that none of the transaction attributes of the second set of transaction attributes violate the rules and/or thresholds of the regulation block. In some instances, the analytic nodes may do so responsive to determining neither set of transaction attributes violates a rule and/or threshold of a corresponding regulation block.

The analytic nodes may transmit instructions to the first computing device and/or the second computing device to append the third block instance to the blockchain of the first computing device and/or the fourth block instance to the blockchain of the second computing device. The instructions may comprise the data of the transaction between the first and second computing devices. The analytic nodes may transmit such instructions to each computing device that maintains the respective blockchain. The instructions may cause the computing devices to append such a block instance to their respective blockchain and verify the new block instance as a quorum.

The instructions to the computing devices may contain a hash of the data or a portion of the data of the transaction between the first and second computing devices. Consequently, devices that were not privy to the transaction (e.g., eavesdroppers) may not learn the details of the transaction but may learn that the transaction occurred and have a record of it. The first and second computing devices may append the block instance comprising the hash to their respective blockchains. The first and second computing devices may also store the details of the transaction in a local database off of their blockchains for review. Consequently, the first and second computing devices may store a record of the transaction without sharing the attributes and other details with other computing devices that were not a party to the transaction.

In addition to or instead of appending the third block instance to the blockchain of the first computing device and the fourth block instance to the blockchain of the second computing device, the consensus may append a block instance that corresponds to the pending transaction to a blockchain that is maintained between the analytic nodes (e.g., administrative nodes and/or the first and/or second computing devices). In some embodiments, in instances in which the first and second computing devices maintain the first blockchain with other peer nodes, the data of the block instance may be hashed so peer nodes that maintain the first blockchain but were not a party to the transaction may not learn the transaction attributes of the transaction.

In response to determining that one of the transaction attributes violates a rule or threshold of a regulation block, the analytic nodes may transmit a message or an alert to the first computing device and/or the second computing device indicating that the transaction could not be verified. The analytic nodes may include an indication of the transaction attribute that violated a rule or threshold and/or a description of the rule or threshold in the message or alert to the second computing device. However, the analytic nodes may not include such a description in the message or alert to the first computing device to maintain the privacy of the rules and/or thresholds of the regulation bock of the second computing device. The analytic nodes may perform a similar process for the first set of transaction attributes and the first computing device.

Figure 4:
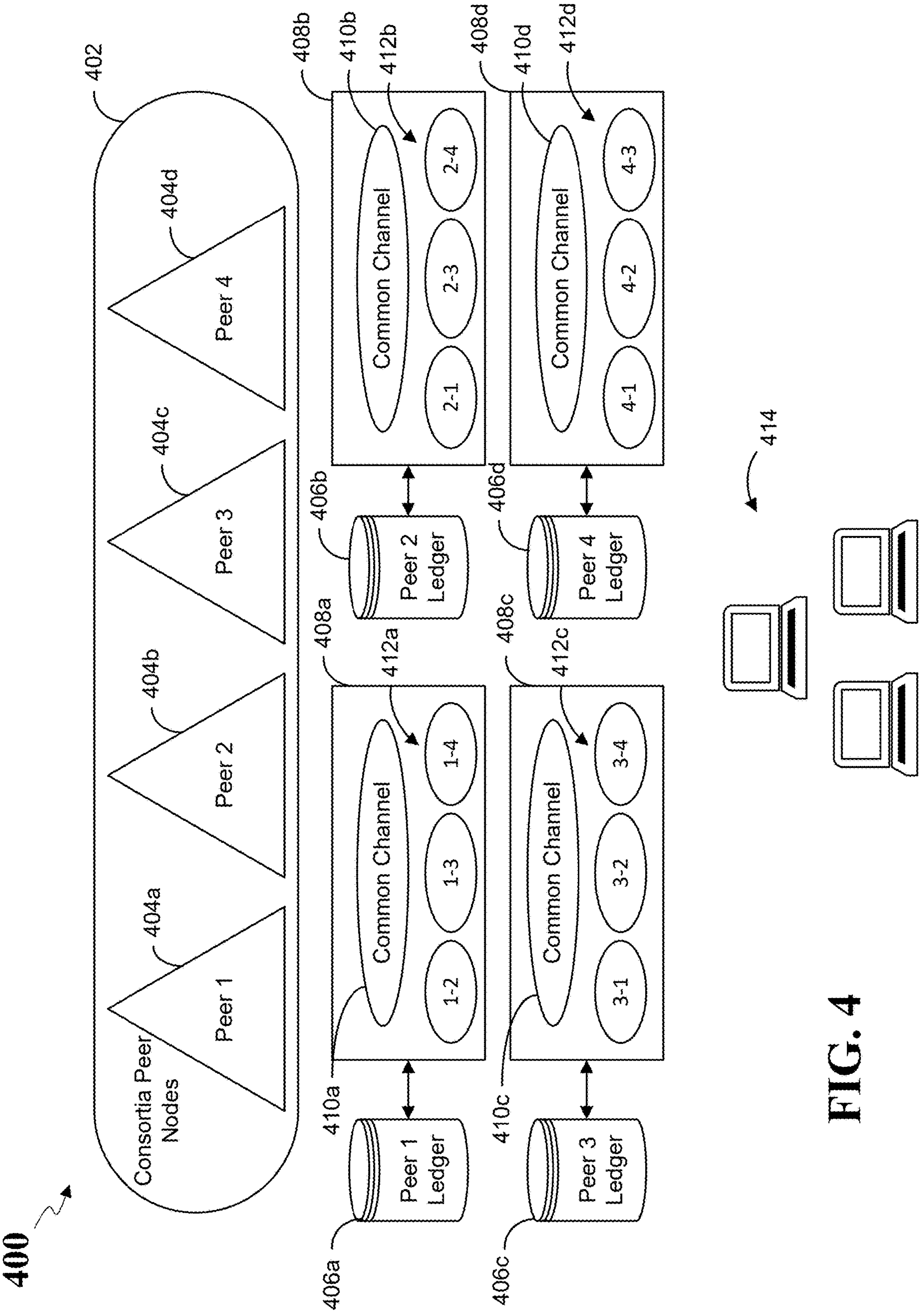
FIG. 4 illustrates another example computer system for maintaining the integrity of transactions across computing systems, according to an embodiment.

FIG. 4 illustrates another example computer system 400 for maintaining the integrity of transactions across computing systems, according to an embodiment. The computer system 400 includes a peer node consortia 402, peer nodes 404*a-d*, peer node ledgers 406*a-d*, channels 408*a-d*, and analytic nodes 414. The peer nodes 404*a-d* may be computing devices of entities (e.g., affiliates) of the same company and may be the same or similar to the peer nodes 120*a-c*. The peer node ledgers 406*a-d* may be ledgers that are stored in local databases of the peer nodes 404*a-d*. The peer node ledgers 406*a-d* may cooperate to maintain a distributed ledger of transactions between peer nodes 404*a-d* and, in some embodiments, regulation blocks specific to each peer node 404*a-d* including rules for transactions into which the respective peer node 404*a-d* may enter. The analytic nodes 414 may maintain a similar distributed ledger to the peer node ledgers 406*a-d*. The channels 408*a-d* may each include a common channel 410*a-d* that is accessible to each of peer nodes 404*a-d* and private channels 412*a-d* that facilitate private communications between subsets of peer nodes 404*a-d*.

In an example embodiment, two of the peer nodes 404*a-d* may enter into a transaction. To do so, the peer nodes 404*a-d* may communicate via a private channel 412*a-d* that is specific between the two peer nodes 404*a-d*. For example, peer node 404*a* may communicate with peer node 404*b* via a private channel 412*a-d* labeled 1-2 or 2-1 in FIG. 4. Their communication may be encrypted such that no peer nodes 404*a-d* or other computing device outside of peer node 404*a* and peer node 404*b* may eavesdrop or sniff their communication.

Continuing with the example above, once peer nodes 404*a* and 404*b* agree to terms or attributes of a transaction, peer nodes 404*a* and 404*b* may each generate a transaction record comprising transaction attributes for the transaction. Each peer node 404*a* and 404*b* may transmit their respective transaction record for the transaction to the analytic nodes 414. A consensus of the analytic nodes 414 may receive or retrieve the transaction records from the peer nodes 404*a* and 404*b*. The consensus of the analytic nodes 414 may compare corresponding attributes of each transaction record with each other. Responsive to determining at least one of the transaction attributes of one transaction record does not match a transaction attribute of another transaction record, the consensus of the analytic nodes 414 may transmit a signal to the peer nodes 404*a* and 404*b* indicating there is a mismatch and, in some cases, the transaction attribute of the mismatch.

Responsive to the consensus of the analytic nodes 414 determining that the transaction attributes match between the transaction records, the consensus of the analytic nodes 414 may identify blockchains and/or regulation block instances that are associated with peer node 404*a* and peer node 404*b*. The consensus of the analytic nodes 414 may identify the blockchain and/or regulation block instances based on transaction attributes in the transaction records that the peer nodes 404*a* and 404*b* transmitted to the consensus of the analytic nodes 414. The transaction attributes may comprise a blockchain address (e.g., a pointer to the blockchain) to a ledger maintained by the respective peer node 404*a* or 404*b* and/or a block instance address to a regulation block of such a blockchain that stores rules and/or thresholds for the respective peer node 404*a* and peer node 404*b*.

The consensus of the analytic nodes 414 may compare the attributes of the transaction to the rules and/or thresholds of the regulation blocks that are associated with the peer nodes 404*a* and 404*b*. The consensus of the analytic nodes 414 may determine if the attributes satisfy the rules and/or thresholds of the regulation blocks based on the comparison. Responsive to determining the attributes of the transaction satisfy or comply with the rules and/or thresholds of the regulation blocks, the consensus of the analytic nodes 414 may append a block instance to the blockchain that the analytic nodes 414 maintain to keep track of the transactions that are performed by peer nodes 404*a-d*. In some embodiments, instead of or in addition to appending the transaction block to the blockchain that is maintained by the analytic nodes 414, the consensus of the analytic nodes may transmit instructions to each of the peer nodes 404*a-d* causing them to append a block instance corresponding to the transaction to the blockchain maintained by peer nodes 404*a-d*. The instructions may only include a hash of the data of the transaction to maintain the privacy of the attributes of the transaction from the individual peer nodes that were not privy to the transaction.

In one embodiment, the methods described herein are facilitated by one of the peer nodes 404*a-d*. For example, two separate entities may seek to enter into a transaction with each other. The two entities may communicate (e.g., via a private channel) and each entity may transmit a transaction record to the peer node 404*a-d* that is facilitating the transaction. The peer node 404*a-d* may receive each transaction record and compare the corresponding attributes of the transaction records between each other. Responsive to the peer node 404*a-d* determining there is a mismatch between transaction attributes, the peer node 404*a-d* may transmit a signal to the entities indicating the mismatch. However, responsive to the peer node 404*a-d* determining the transaction attributes match, the peer node 404*a-d* may identify a block instance (e.g., a regulation block instance) of a blockchain that the peer node 404*a-d* maintains that stores the rules and/or thresholds for transactions that it facilitates. The peer node 404*a-d* may compare the attributes of the transaction to the block instance and, responsive to determining the attributes comply with the rules and/or threshold of the block instance, append a block instance identifying the transaction to the same blockchain as the blockchain of the regulation block instance or another blockchain that the peer node 404*a-d* maintains to keep track of transactions between entities.

Figure 5A:
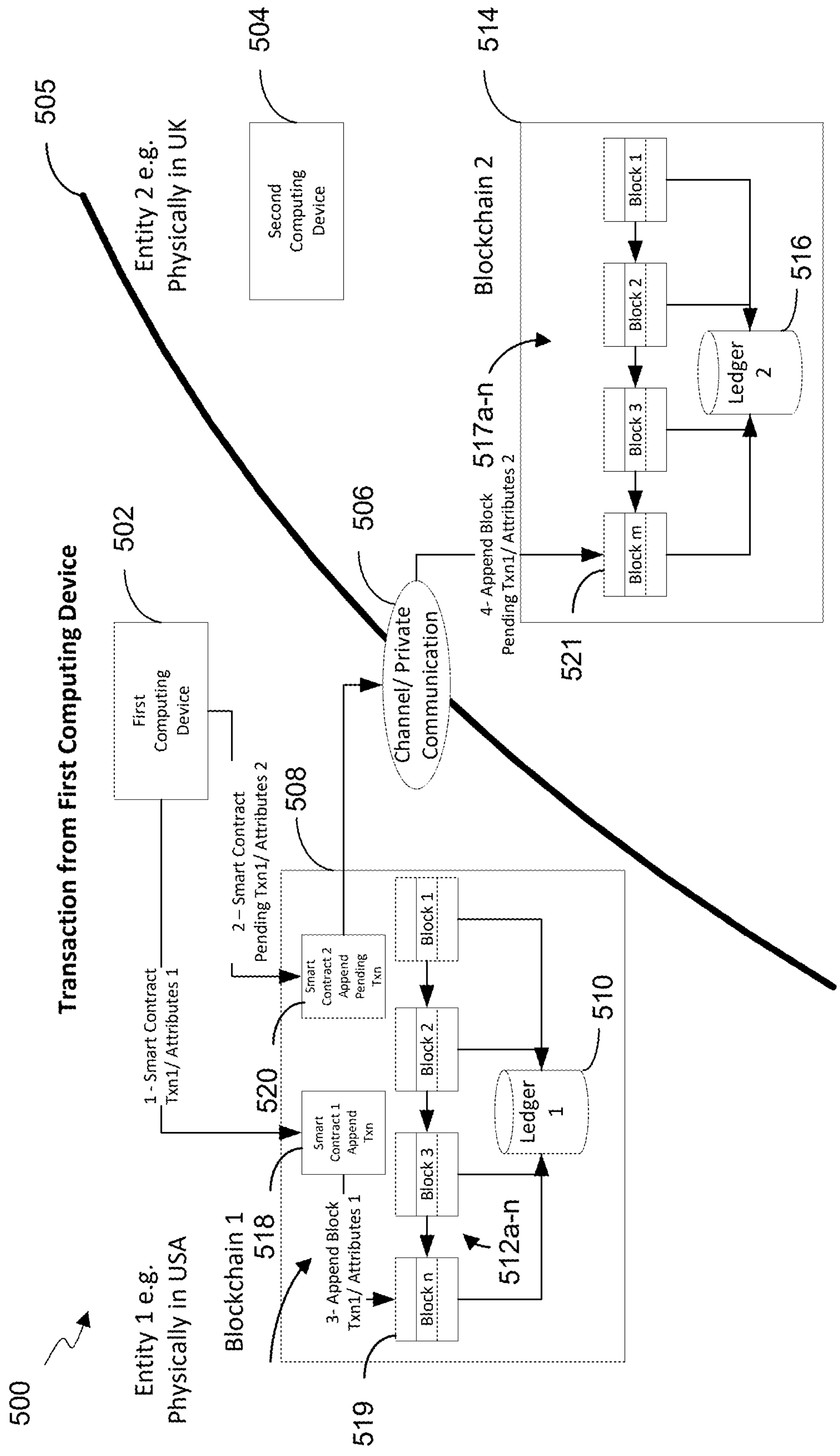
FIG. 5A illustrates another example computer system for maintaining the integrity of transactions across computing systems, according to an embodiment.

FIG. 5A illustrates another example computer system 500 for maintaining the integrity of transactions across computing systems, according to an embodiment. FIG. 5A illustrates the data flow between different components of the computer system 500 during a transaction. The computer system 500 includes a first computing device 502 and a second computing device 504. The first computing device 502 may be in a first location (e.g., the United States) and the second computing device 504 may be in a second location (e.g., Europe or the United Kingdom). As illustrated the computing environments of the first computing device 502 and the second computing device 504 are separated by a geographical separator 505. The first computing device 502 and the second computing device 504 may enter into a transaction by communicating via a private channel 506. The private channel 506 may enable the first computing device 502 and the second computing device 504 to have secure communication that is not accessible to devices outside of the private channel 506. The first computing device 502 may maintain a blockchain 508 that includes a ledger 510 with transaction block instances 512*a-n*. Each of the transaction block instances 512*a-n* may include data for transactions that the first computing device 502 has entered into with other computing devices (e.g., the second computing device 504). Similarly, the second computing device 504 may maintain a blockchain 514 including a ledger 516 with transaction block instances 517*a-n* that each includes data for transactions that the second computing device 504 has entered into with other computing devices (e.g., the first computing device 502).

In one embodiment, when the first computing device 502 enters into a transaction with the second computing device 504, the first computing device 502 and the second computing device 504 may communicate via the private channel 506. Upon reaching an agreement, the first computing device 502 may execute a smart contract protocol 518 to append a block instance 519 to the blockchain 508. The block instance 519 may have a first set of transaction attributes indicating the terms of the transaction. The first computing device 502 may also execute a smart contract protocol 520 to append a block instance 521 to the blockchain 514 of the second computing device 504. The first computing device 502 may do so over the private channel 506. In some embodiments, a portion of the steps of the flow described with reference to FIG. 5A are performed by analytic nodes (or a consensus of the analytic nodes).

Figure 5B:
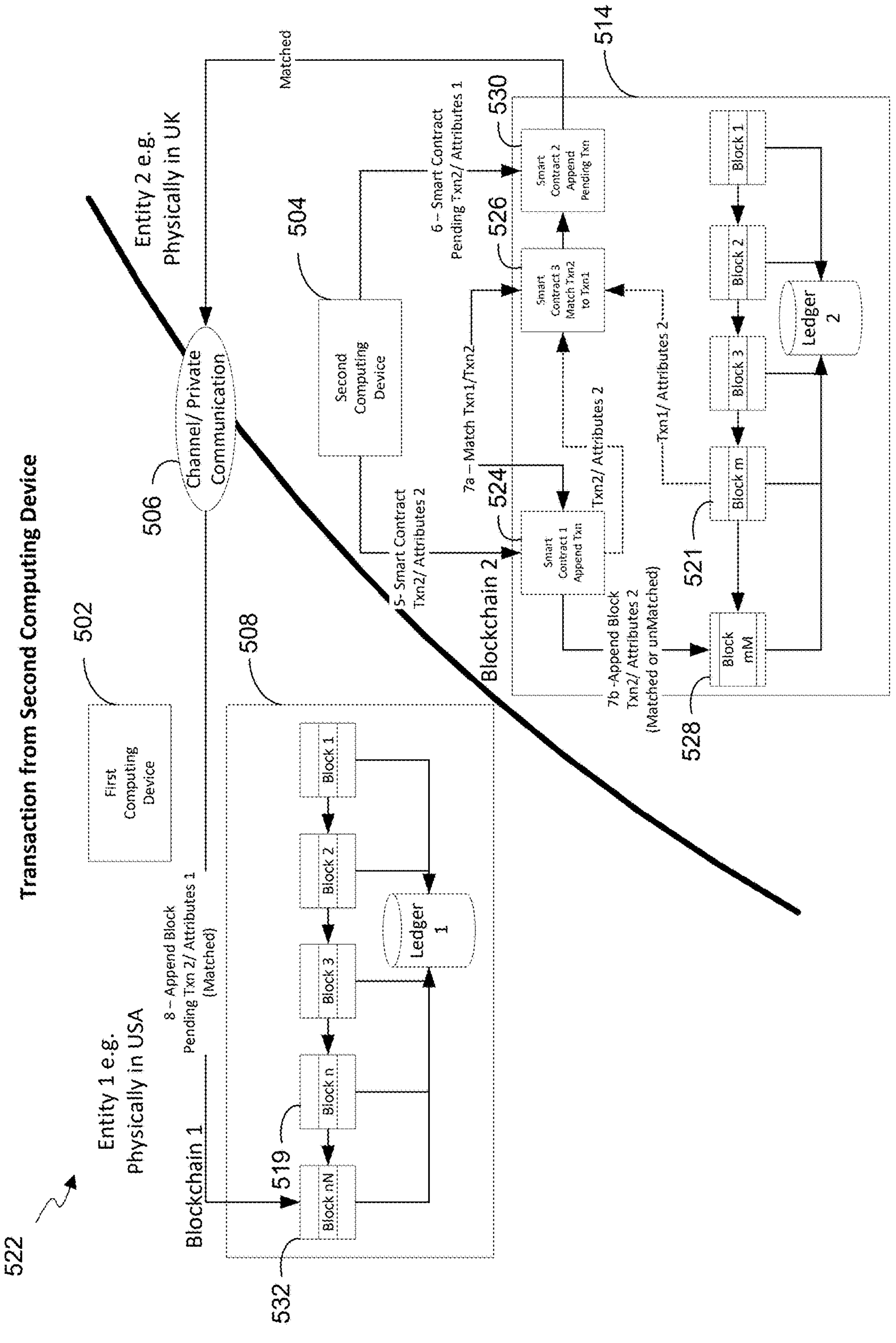
FIG. 5B illustrates another example computer system for maintaining the integrity of transactions across computing systems, according to an embodiment.

FIG. 5B illustrates another example computer system 522 for maintaining the integrity of transactions across computing systems, according to an embodiment. FIG. 5B may illustrate the flow after the first computing device 502 executes the smart contract protocol 520 to append a block instance for a transaction between the first computing device 502 and the second computing device 504 to the blockchain 514 of the second computing device 504, as shown and described with reference to FIG. 5A. The computer system 522 may include the same or similar components to the computer system 500.

Upon the block instance for the pending transaction being appended to the blockchain 514, the second computing device 504 may execute a smart contract protocol 524 to generate a block instance with transaction attributes for the transaction with the first computing device 502. The block instance may include a second set of transaction attributes for the transaction. The second computing device 504 may retrieve or receive the first set of transaction attributes from the block instance 521 of the blockchain 514 of the second computing device 504. The second computing device 504 may execute a smart contract protocol 526 to compare the first set of transaction attributes with the second set of transaction attributes. Upon identifying a match, the second computing device 504 may append the block instance 528 for the transaction to the blockchain 514 (e.g., the block instance 521). Instead or additionally, the second computing device 504 may execute a smart contract protocol 530 to append a block instance 532 to the blockchain 508 (e.g., to the block instance 519) of the first computing device 502. The second computing device 504 may do so over the private channel 506.

In some embodiments, the second computing device 504 may append the block instance 528 to the blockchain 514 in instances in which the sets of transaction attributes do not match. In such instances, the second computing device 504 may append the block instance 528 including the transaction attributes of the second set of transaction attributes to the blockchain 514 and transmit a signal to the first computing device 502 across the private channel 506 indicating that the transaction terms did not match and indicating the transaction attributes of block instance 528. The first computing device 502 may receive the indication and append the block instance 532 to the blockchain 508 with the indicated attributes of the second set of transaction attributes as data of the block instance 532. In some instances, upon receiving the indication from the second computing device 504, the flow described with reference to FIGS. 5A-5B repeats until the first computing device 502 and the second computing device 504 append block instances to their respective blockchains with matching transaction attributes.

In some embodiments, the second computing device 504 may only append the block instance 528 to the blockchain 514 after determining that the second set of transaction attributes comply with regulations of a regulation block as described herein. The second computing device 504 may identify regulations from a regulation block instance of the blockchain 514 or another blockchain that the second computing device 504 maintains and compare the second set of transaction attributes to the regulations of the regulation block. Responsive to determining the second set of transaction attributes comply with the regulation block, the second computing device 504 may append the block instance 528 to the blockchain 514 (e.g., to the block instance 521). In some embodiments, instead of comparing the transaction attributes to a regulation block of a blockchain, the second computing device 504 may compare the transaction attributes to regulations stored in a non-blockchain database stored by or associated with the second computing device 504.

Similarly, in some embodiments, responsive to receiving a signal indicating that the sets of transaction attributes match, the first computing device 502 may compare the transaction attributes of the first set or the second set of transaction attributes to a regulation block of the blockchain 508 or another blockchain that the first computing device 502 maintains or helps maintain. In some embodiments, the first computing device 502 may compare the transaction attributes to regulations stored in a non-blockchain based database stored by or associated with the first computing device 502.

In some embodiments, the second computing device 504 may not append the block instance 528 to the blockchain 514 until the second computing device 504 receives a signal from the first computing device 502 indicating the transaction attributes of the first or second set of transaction attributes comply with the corresponding regulations of the first computing device 502. In some embodiments, a portion of the steps of the flow described with reference to FIG. 5B are performed by analytic nodes (or a consensus of the analytic nodes).

Figure 6:
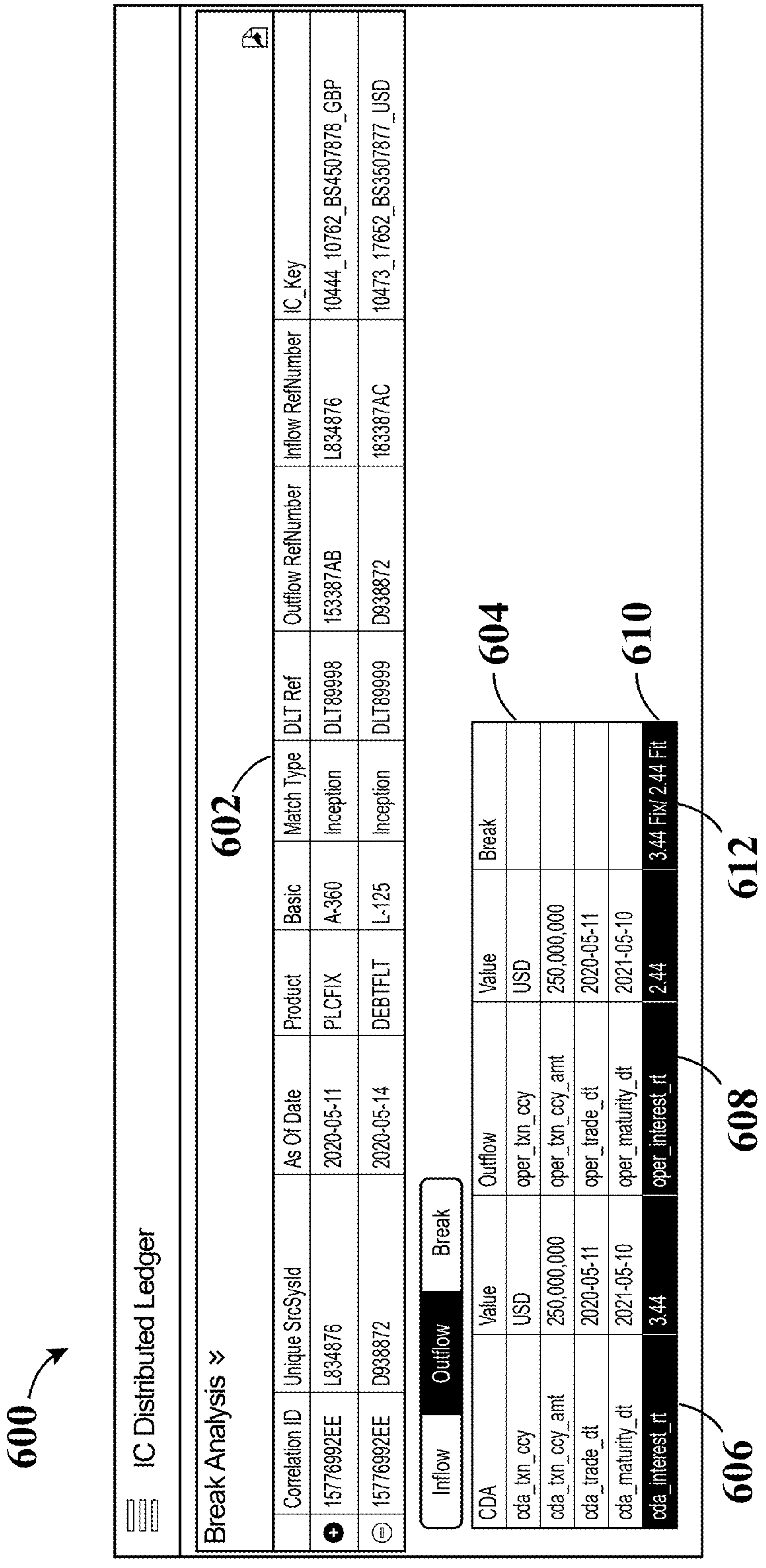
FIG. 6 illustrates a screenshot of an example user interface showing a transaction break analysis for a transaction, according to an embodiment.

FIG. 6 illustrates a screenshot of a user interface 600 showing a transaction break analysis for a transaction, according to an embodiment. The user interface 600 includes a list of transactions 602 and a list of transaction attributes 604. The list of transactions 602 is shown to include different categories with data about the transactions and indications of whether there was a break in the transactions. As illustrated, the list of transaction attributes 604 may be a list of transaction attributes for the transaction with correlation ID "15776992EE." The list of transaction attributes 604 may include a first set of transaction attributes 606 of a transaction record that was generated by one party to the transaction and the values of the transaction attributes. The list of transaction attributes 604 may also include a second set of transaction attributes 608 that was generated by the other party to the transaction and the values of transaction attributes of the second set of transaction attributes 608. A user or an administrator may select the transactions of the list of transactions 602 to view the attributes of the transaction and view or identify any errors that occurred (e.g., differing corresponding transaction attributes) that caused the analytic nodes to reject the transaction. As illustrated, there is a difference between the cda-interest_rt attribute of the first set of transaction attributes 606 and the oper_interest_rt attribute of the second set of transaction attributes 608. The difference has been identified as a break 610 in a break column 612 that identifies breaks or differences in transaction attributes between the first set of transaction attributes 604 and the second set of transaction attributes 608.

Figure 7:
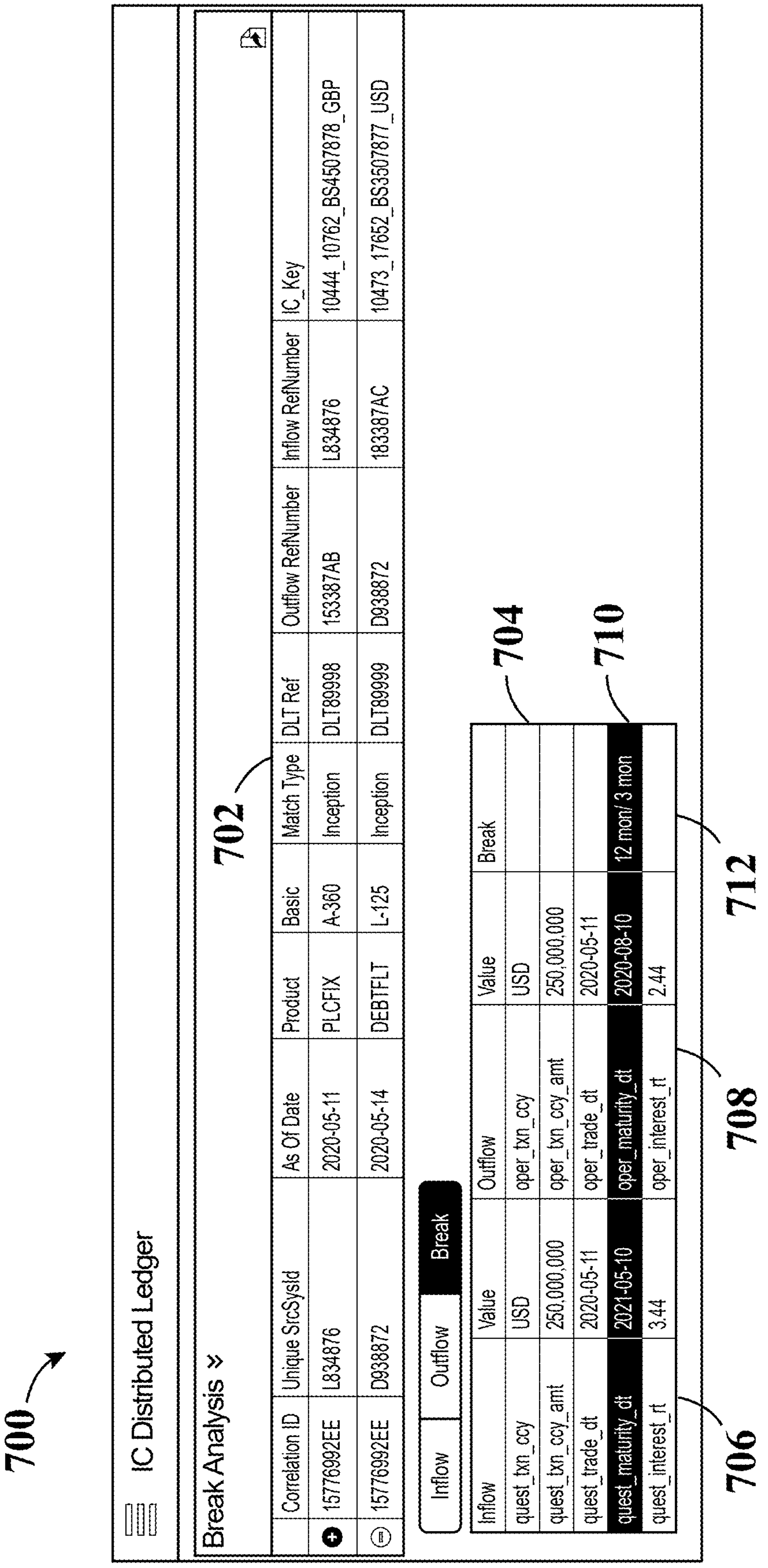
FIG. 7 illustrates a screenshot of an example user interface showing another transaction break analysis for the transaction of FIG. 6, according to an embodiment.

FIG. 7 illustrates a screenshot of a user interface 700 showing a transaction break analysis for another transaction, according to an embodiment. The user interface includes a list of transactions 702 and a list of transaction attributes 704. The list of transactions 702 may be the same or similar to the list of transactions 702, shown and described with reference to FIG. 6. The list of transaction attributes 704 may show two sets of transaction attributes and their corresponding values. The two sets of transaction attributes 706 and 708 may be associated with or correspond to the same transaction (e.g., correlation ID "15776992EE"). The set of transaction attributes 706 may correspond to a transaction record generated by a first computing device for a transaction and the set of transaction attributes 708 may correspond to a transaction record generated by a second computing device for the same transaction. As illustrated, the corresponding attributes of the sets of transaction attributes 706 and 708 match with each other except for the maturity date (which is highlighted). The analytic nodes may have identified the maturity dates between the sets of transaction attributes 706 and 706 as not matching by a year and three months. Accordingly, the analytic nodes may identify the maturity date of the transaction as a break 710 in a break column 712 by highlighting the attribute.

In a non-limiting embodiment of the present disclosure, a computer-implemented method may be performed by the consensus of nodes. The method may include receiving a first transaction request from a first computing device, the first transaction request corresponding to a pending transaction between the first computing device and a second computing device and comprising a first set of transaction attributes, and appending a block instance to the blockchain of the first computing device. The method may further include identifying a blockchain of the second computing device based on at least one transaction attribute of the first set of transactions, and appending a block instance of the pending transaction to the blockchain of the second computing device. The method may further include receiving or retrieving, from the second computing device, a second transaction request, the second transaction request corresponding to the pending transaction between the second computing device and the first computing device and comprising a second set of transaction attributes. The method may further include executing a smart contract protocol to compare the second set of transaction attributes with the first set of transaction attributes stored onto the ledger of the blockchain of the second computing device. The method may further include, responsive to determining that the second set of transaction attributes complies with the first set of transaction attributes, appending a block instance of the pending transaction to the blockchain of the second computing device and a block instance of the pending transaction to the blockchain of the first computing device.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:

a plurality of nodes each corresponding to a computing device having a processor and memory to store data, wherein one or more computing devices of the plurality of nodes is configured to:

receive a first transaction request from a first computing device, the first transaction request corresponding to a pending transaction between the first computing device and a second computing device and comprising a first plurality of transaction attributes;

append a first block instance comprising the first plurality of transaction attributes to a blockchain of the second computing device;

responsive to receiving, from the second computing device, a second transaction request corresponding to the pending transaction between the first computing device and the second computing device, the second transaction request comprising a second plurality of transaction attributes corresponding to the pending transaction, retrieve the first plurality of transaction attributes from the first block instance;

responsive to determining that the first plurality of transaction attributes are not the same as the second plurality of transaction attributes, generate an alert to the first computing device or the second computing device indicating a difference between the first plurality of transaction attributes and the second plurality of transaction attributes;

receive an adjustment to the first plurality of transaction attributes or the second plurality of transaction attributes that corresponds to the difference from the first computing device or the second computing device; and responsive to the adjusted first plurality of transaction attributes or second plurality of transaction attributes being the same as the other of the first plurality of transaction attributes or the second plurality of transaction attributes, append a second block instance to a blockchain of the first computing device and a third block instance to the blockchain of the second computing device, the second block instance and the third block instance comprising data corresponding to the second transaction request.

2. The system of claim 1, wherein the first computing device communicates the pending transaction with the second computing device via a private channel that is not accessible to other computing devices.

3. The system of claim 1, wherein the one or more computing devices of the plurality of nodes are configured to:

append a fourth block instance comprising the first plurality of transaction attributes to the blockchain of the first computing device in response to the first transaction request.

4. The system of claim 1, wherein the alert comprises a list of differences between the first plurality of transaction attributes and the second plurality of transaction attributes.

5. The system of claim 1, wherein the first plurality of transaction attributes comprise a blockchain identifier or a block instance identifier and the one or more computing devices are configured to identify a second blockchain of the first computing device based on the blockchain identifier or the block instance identifier.

6. The system of claim 5, wherein the first computing device corresponds to the second blockchain, wherein the second blockchain comprises a ledger comprising a set of rules, wherein the one or more computing devices are further configured to automatically execute a second protocol to compare the second plurality of transaction attributes with the set of rules, and wherein the one or more computing devices are further configured to append the second block instance to the blockchain of the first computing device or the third block instance to the blockchain of the second computing device responsive to determining that the second plurality of transaction attributes complies with the set of rules.

7. The system of claim 6, wherein the set of rules is stored in a regulation block of the second blockchain, and wherein the one or more computing devices are configured to automatically execute the second protocol to compare the second plurality of transaction attributes with the set of rules stored in the regulation block.

8. The system of claim 1, wherein the one or more computing devices are further configured to:

determine attribute types for each attribute of the first plurality of transaction attributes and the second plurality of transaction attributes; and determine whether the attributes of the first plurality of transaction attributes match corresponding attributes of the second plurality of transaction attributes based on the determined attribute types.

9. The system of claim 1, wherein the first plurality of transaction attributes and the second plurality of transaction attributes each comprise at least two of a second transaction type, a second length, a second start date, a second end date, a second amount, or a second maturity date of the pending transaction.

10. The system of claim 1, wherein each of the second block instance and the third block instance comprises a hash of at least data of the pending transaction.

11. A method, comprising:

receiving, by one or more computing devices of a plurality of nodes, a first transaction request from a first computing device, the first transaction request corresponding to a pending transaction between the first computing device and a second computing device and comprising a first plurality of transaction attributes;

appending, by the one or more computing devices, a first block instance comprising the first plurality of transaction attributes to a blockchain of the second computing device;

responsive to receiving, from the second computing device, a second transaction request corresponding to the pending transaction between the first computing device and the second computing device, the second transaction request comprising a second plurality of transaction attributes corresponding to the pending transaction, retrieve the first plurality of transaction attributes from the first block instance;

responsive to determining that the first plurality of transaction attributes are not the same as the second plurality of transaction attributes, generating, by the one or more computing devices, an alert to the first computing device or the second computing device indicating a difference between the first plurality of transaction attributes and the second plurality of transaction attributes;

receiving, by the one or more computing devices, an adjustment to the first plurality of transaction attributes or the second plurality of transaction attributes that corresponds to the difference from the first computing device or the second computing device; and responsive to the adjusted first plurality of transaction attributes or second plurality of transaction attributes being the same as the other of the first plurality of transaction attributes or the second plurality of transaction attributes, appending, by the one or more computing devices, a second block instance to a blockchain of the first computing device and a third block instance to the blockchain of the second computing device, the second block instance and the third block instance comprising data corresponding to the second transaction request.

12. The method of claim 11, wherein the first computing device communicates the pending transaction with the second computing device via a private channel that is not accessible to other computing devices.

13. The method of claim 11, comprising:

appending, by the one or more computing devices, a fourth block instance comprising the first plurality of transaction attributes to the blockchain of the first computing device in response to the first transaction request.

14. The method of claim 11, wherein the alert comprises a list of differences between the first plurality of transaction attributes and the second plurality of transaction attributes.

15. The method of claim 11, wherein the first plurality of transaction attributes comprise a blockchain identifier or a block instance identifier and the method comprises identifying, by the one or more computing devices, a second blockchain of the first computing device based on the blockchain identifier or the block instance identifier.

16. The method of claim 15, wherein the first computing device corresponds to the second blockchain, wherein the second blockchain comprises a ledger comprising a set of rules, wherein the method further comprises automatically executing, by the one or more computing devices, a second protocol to compare the second plurality of transaction attributes with the set of rules, and wherein the method further comprises appending, by the one or more computing devices, the second block instance to the blockchain of the first computing device or the third block instance to the blockchain of the second computing device responsive to determining that the second plurality of transaction attributes complies with the set of rules.

17. The method of claim 16, wherein the set of rules is stored in a regulation block of the second blockchain, and wherein the method further comprises automatically executing, by the one or more computing devices, the second protocol to compare the second plurality of transaction attributes with the set of rules stored in the regulation block.

18. The method of claim 11, further comprising:

determining, by the one or more computing devices, attribute types for each attribute of the first plurality of transaction attributes and the second plurality of transaction attributes; and determining, by the one or more computing devices, whether the attributes of the first plurality of transaction attributes match corresponding attributes of the second plurality of transaction attributes based on the determined attribute types.

19. The method of claim 11, wherein the first plurality of transaction attributes and the second plurality of transaction attributes each comprise at least two of a second transaction type, a second length, a second start date, a second end date, a second amount, or a second maturity date of the pending transaction.

20. The method of claim 11, wherein each of the second block instance and the third block instance comprises a hash of at least data of the pending transaction.

* * * * *